(12) United States Patent
Li et al.

(10) Patent No.: US 11,798,223 B2
(45) Date of Patent: Oct. 24, 2023

(54) POTENTIALLY VISIBLE SET DETERMINING METHOD AND APPARATUS, DEVICE, AND STORAGE MEDIUM

(71) Applicant: TENCENT TECHNOLOGY (SHENZHEN) COMPANY LIMITED, Guangdong (CN)

(72) Inventors: Hai Quan Li, Shenzhen (CN); Gui Xiong Lai, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 477 days.

(21) Appl. No.: 17/185,328

(22) Filed: Feb. 25, 2021

(65) Prior Publication Data

US 2021/0183137 A1 Jun. 17, 2021

Related U.S. Application Data

(63) Continuation of application No. PCT/CN2019/120864, filed on Nov. 26, 2019.

(30) Foreign Application Priority Data

Dec. 7, 2018 (CN) .......................... 201811493375.0

(51) Int. Cl.
*G06T 15/20* (2011.01)
*A63F 13/5378* (2014.01)
(Continued)

(52) U.S. Cl.
CPC .......... *G06T 15/20* (2013.01); *A63F 13/5378* (2014.09); *A63F 13/803* (2014.09);
(Continued)

(58) Field of Classification Search
CPC ......... G06T 15/20; G06T 15/04; G06T 15/40; G06T 7/90; G06T 19/20; A63F 13/5378; A63F 13/803
See application file for complete search history.

(56) References Cited

U.S. PATENT DOCUMENTS 5,914,721 A * 6/1999 Lim ....................... G06T 15/40
345/422
2002/0190989 A1 12/2002 Kamata et al.
(Continued)

FOREIGN PATENT DOCUMENTS

| CN | 106780693 A | 5/2017 |
|----|-------------|--------|
| CN | 108888954 A | 11/2018 |
| CN | 109615686 A | 4/2019 |

OTHER PUBLICATIONS

International Search Report dated Mar. 2, 2020, issued by the International Searching Authority in application No. PCT/CN2019/120864.
(Continued)

*Primary Examiner* — Steve Rowland
(74) *Attorney, Agent, or Firm* — Sughrue Mion, PLLC

(57) ABSTRACT

A method of determining a potentially visible set (PVS) includes: dividing a map area into a plurality of detection point areas, the map area corresponding to a movable range of a virtual object in a virtual environment; replacing a map material of a three-dimensional (3D) object in a detection point area with a single-colored material, color identifiers of single-colored materials corresponding to all of 3D objects included in the virtual environment being different; determining at least one detection point in the detection point area; performing rendering to obtain a cubemap corresponding to the at least one detection point, and determining a target color identifier of a single color appearing on the
(Continued)

cubemap; and adding a 3D object corresponding to the target color identifier to a PVS of the detection point area.

20 Claims, 16 Drawing Sheets

(51) Int. Cl.
    *A63F 13/803* (2014.01)
    *G06T 7/90* (2017.01)
    *G06T 15/04* (2011.01)
    *G06T 19/20* (2011.01)
(52) U.S. Cl.
    CPC ............... *G06T 7/90* (2017.01); *G06T 15/04* (2013.01); *G06T 19/20* (2013.01); *G06T 2219/2012* (2013.01)

(56) References Cited

U.S. PATENT DOCUMENTS

| | | | | |
|---|---|---|---|---|
| 2003/0160787 A1* | 8/2003 | Buehler | .................. | G06T 15/06 345/421 |
| 2004/0075878 A1* | 4/2004 | Cameron | ............. | G03H 1/0808 359/15 |
| 2011/0285710 A1* | 11/2011 | Mejdrich | ................ | G06T 15/06 345/426 |
| 2011/0316855 A1* | 12/2011 | Mejdrich | ................ | G06T 15/06 345/420 |
| 2012/0249556 A1* | 10/2012 | Chandak | ................. | A63F 13/54 345/473 |
| 2015/0269770 A1* | 9/2015 | Jenkins | ................... | G06T 15/20 345/421 |
| 2020/0143586 A1* | 5/2020 | Kaplan | ................ | A63F 13/573 |

OTHER PUBLICATIONS

Written Opinion dated Mar. 2, 2020, issued by the International Searching Authority in application No. PCT/CN2019/120864.
Extended European Search Report dated Sep. 22, 2021, issued by the European Patent Office in application No. 19893835.9.
Communication dated Oct. 12, 2021, issued by the European Patent Office in application No. 19893835.9.
Sydd_shadow. "The realization principle and details of SkyBox", URL: https://blog.csdn.net/yjr3426619/article/details/81224101, Jul. 26, 2018, 20 pages.

* cited by examiner

POTENTIALLY VISIBLE SET DETERMINING METHOD AND APPARATUS, DEVICE, AND STORAGE MEDIUM

CROSS-REFERENCE TO RELATED APPLICATION(S)

This application is a bypass continuation application of International Application No. PCT/CN2019/120864, filed on Nov. 26, 2019, which claims the priority to Chinese patent application No. 201811493375.0, filed with the China National Intellectual Property Administration on Dec. 7, 2018 and entitled "POTENTIALLY VISIBLE SET DETERMINING METHOD AND APPARATUS, DEVICE, AND STORAGE MEDIUM", the disclosures of which are herein incorporated by reference in their entireties.

FIELD

The disclosure relates to the field of data processing technologies, and in particular, to a potentially visible set (PVS) determining method and apparatus, a device, and a storage medium.

BACKGROUND

Rendering performance is an important factor in a running process of an application supporting a three-dimensional (3D) virtual environment, which determines the running smoothness of the application supporting the 3D virtual environment, and is limited by a central processing unit (CPU). For example, in a 3D racing game, the CPU frequently sends commands to a graphics processing unit (GPU) by using a Draw Call to perform rendering operations. As a result, the Draw Call accounts for a majority portion (e.g., half) of CPU consumption by the 3D racing game. Therefore, the CPU performs visible detection on a map scene of the 3D racing game through pre-computation, to reduce CPU consumption by the Draw Call.

During the pre-computation of the CPU, the camera model randomly emits rays around the camera model by using the camera model as an origin, to determine a visible object around the camera model. When there is an intersection between an emitted ray and an object, the CPU determines that the object is a visible object. When there is no intersection between an emitted ray and an object, the CPU determines that the object is an invisible object.

However, in the CPU's manner of randomly emitting rays for pre-computation, when a quantity of the emitted rays is not sufficient, there may be an object incorrectly determined as an invisible object because no ray hits the object, and the CPU does not send a command to the GPU by using the Draw Call to render the object. In this case, while the CPU consumption by the Draw Call is reduced, a final result displayed in a PVS is incorrect.

SUMMARY

Embodiments of the disclosure provide a potentially visible set (PVS) determining method and apparatus, device, and storage medium, and a three-dimensional (3D) scene rendering method and apparatus, device, and storage medium.

According to an aspect of an example embodiment, provided is a method of determining a potentially visible set (PVS), performed by at least one processor of a computer device, the method including:

dividing a map area into a plurality of detection point areas, the map area corresponding to a movable range of a virtual object in a virtual environment;

replacing a map material of a 3D object in the detection point area with a single-colored material, color identifiers of single-colored materials corresponding to all of 3D objects included in the virtual environment being different;

determining at least one detection point in the detection point area;

performing rendering to obtain a cubemap corresponding to the at least one detection point, and determining a target color identifier of a single color appearing on the cubemap; and adding a 3D object corresponding to the target color identifier to a PVS of the detection point area.

According to an aspect of an example embodiment, provided is a 3D scene rendering method, applicable to a computer device storing a detection point area and a PVS, the PVS being generated by using the method described above, and the method including:

detecting whether a detection point area in which a camera model is located in a current frame is the same as a detection point area in which the camera model is located in a previous frame;

based on the detection point area in which the camera model is located in the current frame being different from the detection point area in which the camera model is located in the previous frame, reading a PVS of the detection point area in which the camera model is located in the current frame; and performing rendering according to the PVS of the detection point area in which the camera model is located in the current frame, to obtain a lens picture of the camera model.

According to an aspect of an example embodiment, provided is a PVS determining method, performed by a computer device and applicable to a 3D racing game, the 3D racing game including a track area located in a virtual environment, and the method including:

dividing the track area into a plurality of detection point areas;

replacing a map material of a 3D object in a detection point area with a single-colored material, color identifiers of single-colored materials corresponding to all of 3D objects included in the virtual environment being different;

determining at least one detection point in the detection point area;

performing rendering to obtain a cubemap corresponding to at least one the detection point, and determining a target color identifier of a single color appearing on the cubemap; and adding a 3D object corresponding to the target color identifier to a track PVS of the detection point area.

According to an aspect of an example embodiment, provided is a PVS determining apparatus, including:

at least one memory configured to store program code; and at least one processor configured to read the program code and operate as instructed by the program code, the program code comprising:

first division code configured to cause at least one of the at least one processor to divide a map area into a plurality of detection point areas, the map area corresponding to a movable range of a virtual object in a virtual environment;

first replacement code configured to cause at least one of the at least one processor to replace a map material of a 3D object in the detection point area with a single-colored material, color identifiers of single-colored materials corresponding to all of 3D objects included in the virtual environment being different;

first determining code configured to cause at least one of the at least one processor to determine at least one detection point in the detection point area;

first rendering code configured to cause at least one of the at least one processor to perform rendering to obtain a cubemap corresponding to the detection point, and determine a target color identifier of a single color appearing on the cubemap; and first adding code configured to cause at least one of the at least one processor to add a 3D object corresponding to the target color identifier to a PVS of the detection point area.

According to an aspect of an example embodiment, provided is a 3D scene rendering apparatus, applicable to a computer device storing a detection point area and a PVS, the PVS being generated by using the method described above, and the apparatus including:

at least one memory configured to store program code; and at least one processor configured to read the program code and operate as instructed by the program code, the program code comprising:

detection code configured to cause at least one of the at least one processor to detect whether a detection point area in which a camera model is located in a current frame is the same as a detection point area in which the camera model is located in a previous frame;

reading code configured to cause at least one of the at least one processor to, based on the detection point area in which the camera model is located in the current frame being different from the detection point area in which the camera model is located in the previous frame, read a PVS of the detection point area in which the camera model is located in the current frame; and second rendering code configured to cause at least one of the at least one processor to perform rendering according to the PVS of the detection point area in which the camera model is located in the current frame, to obtain a lens picture of the camera model.

According to an aspect of an example embodiment, provided is a PVS determining apparatus, applicable to a 3D racing game, the 3D racing game including a track area located in a virtual environment, and the apparatus including:

at least one memory configured to store program code; and at least one processor configured to read the program code and operate as instructed by the program code, the program code comprising:

second division code configured to cause at least one of the at least one processor to divide the track area into a plurality of detection point areas;

second replacement code configured to cause at least one of the at least one processor to replace a map material of a 3D object in the detection point area with a single-colored material, color identifiers of single-colored materials corresponding to all of 3D objects included in the virtual environment being different;

second determining code configured to cause at least one of the at least one processor to determine at least one detection point in the detection point area;

third rendering code configured to cause at least one of the at least one processor to perform rendering to obtain a cubemap corresponding to the at least one detection point, and determine a target color identifier of a single color appearing on the cubemap; and second adding code configured to cause at least one of the at least one processor to add a 3D object corresponding to the target color identifier to a track PVS of the detection point area.

According to an aspect of an example embodiment, provided is a computer device, including a processor and a memory, the memory storing computer-readable instructions, the computer-readable instructions, when executed by the processor, causing the processor to perform the operations of the PVS determining method described above.

According to an aspect of an example embodiment, provided is a computer device, including a processor and a memory, the memory storing computer-readable instructions, the computer-readable instructions, when executed by the processor, causing the processor to perform the operations of the 3D scene rendering method described above.

According to an aspect of an example embodiment, provided is a computer-readable storage medium, storing computer-readable instructions, the computer-readable instructions, when executed by one or more processors, causing the one or more processors to perform the operations of the PVS determining method described above.

According to an aspect of an example embodiment, provided is a computer-readable storage medium, storing computer-readable instructions, the computer-readable instructions, when executed by one or more processors, causing the one or more processors to perform the operations of the 3D scene rendering method described above.

BRIEF DESCRIPTION OF THE DRAWINGS

To describe the technical solutions in the embodiments of the disclosure more clearly, the accompanying drawings required for describing the embodiments are briefly described hereinafter. Apparently, the accompanying drawings in the following description show merely some embodiments of the disclosure, and a person of ordinary skill in the art may obtain other accompanying drawings according to these accompanying drawings without creative efforts.

DETAILED DESCRIPTION

Figure 1:
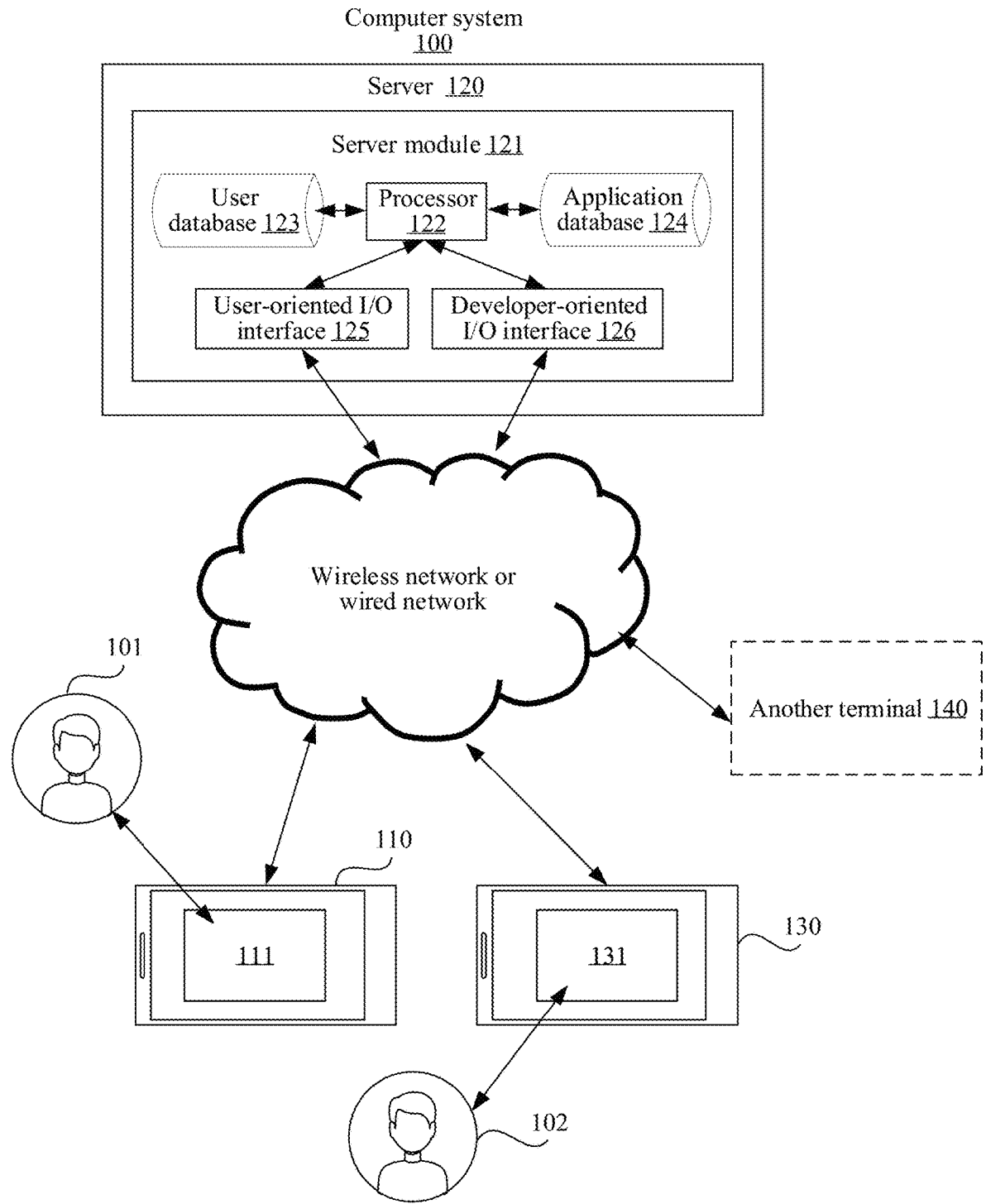
FIG. 1 is a structural block diagram of a computer system according to an example embodiment of the disclosure.

To make the objectives, technical solutions, and advantages of the disclosure clearer, implementations of the disclosure are further described below in detail with reference to the accompanying drawings.

First, the following explains several terms involved in the embodiments of the disclosure.

A virtual environment is a virtual environment displayed (or provided) when an application is run on a terminal. The virtual environment may be a simulated environment of the real world, or may be a semi-simulated semi-fictional three-dimensional (3D) environment, or may be an entirely fictional 3D environment. The virtual environment may be any one of a two-dimensional virtual environment, a 2.5-dimensional virtual environment, and a 3D virtual environment. The following embodiments are descried by using an example in which the virtual environment is a 3D virtual environment, but not limited thereto. Optionally, the virtual environment includes at least one virtual role, and the virtual role moves in the virtual environment. Optionally, the virtual environment is further used for a virtual environment racing between at least two virtual roles. Optionally, the virtual environment is further used for racing between at least two virtual roles by virtual vehicles.

A virtual object is a movable object in the virtual environment. The movable object may be at least one of a virtual character, a virtual animal, a cartoon character, and a virtual vehicle. Optionally, when the virtual environment is a 3D virtual environment, the virtual object is a 3D model. Each virtual object has a respective shape and size in the 3D virtual environment, and occupies some space in the 3D virtual environment.

A graphics processing unit (GPU), also referred to as a display core, a vision processor, or a display chip, is a microprocessor on a terminal that specializes in performing an image operation on an image. The GPU is configured to render a 3D object in a detection point area according to a command of a central processing unit (CPU), so that a rendered 3D object has a 3D effect.

A Draw Call is a function interface for the CPU to call graphics programming. The CPU sends a rendering command to the GPU by using the Draw Call, and the GPU performs a rendering operation according to the rendering command. The Draw Call is configured to transfer a parameter of the rendering command between the CPU and the GPU.

A frustum is a cube similar to a pyramid shape with the top cut off by a plane parallel to the bottom. The frustum has a total of six surfaces: upper, lower, left, right, near, and far surfaces. The frustum is a visual range determined according to an angle of a camera lens of a camera model by using the camera model as an origin. That is, the frustum is a visual range similar to a pyramid shape generated according to the angle of the camera lens of the camera model. Objects excessively close to the camera model or excessively far from the camera model within the visual range similar to a pyramid shape are not displayed in the camera lens. A visual range that may be displayed in the camera lens is a frustum. Therefore, the frustum is a cubic space for displaying an object in the camera lens, and an object located in the frustum is a visible object, while an object outside the frustum is an invisible object. A 3D object located in the frustum is displayed on a two-dimensional plane of the camera lens through projection, and an image displayed through the projection is an image seen by a human eye in a map scene.

A detection point area is a convex quadrilateral area obtained through division according to a division rule in the virtual environment. The division rule includes at least one of division along a predetermined route that the virtual object travels and division according to a movement range (or movable range) of the virtual object. Optionally, in a 3D racing game, a detection point area is a convex quadrilateral area obtained through division according to a track route in a virtual environment of the 3D racing game, and the detection point area remains unchanged after the division.

An occlusion culling means that in the camera lens, when an object is occluded by another object and becomes invisible, the CPU does not render the object. The CPU reduces objects rendered in a map scene by using the method of occlusion culling, to reduce CPU consumption by the Draw Call. In addition, to reduce repeated rendering operations, a method of measuring distances between the camera and objects is used, to perform occlusion culling operations on the objects in ascending order of the distances.

A cubemap is a cube obtained by joining six two-dimensional texture maps. The cubemap is a cube having six two-dimensional texture maps that is formed by the camera model by performing rendering on each of six directional planes (that is, rotating the angle of the camera lens by 90° each time) by using the camera model as a center. The cubemap is used for rendering a distant scene such as sky, so that the distant scene may be stationary relative to a moving object (such as a virtual character in movement), to implement an effect of the distant scene.

A potentially visible set (PVS) is a set of objects remaining visible after occlusion culling at a position of a viewpoint or in an area in which the viewpoint is located.

A vertex shader is configured to perform various operations on vertex data having a vertex attribute.

A pixel shader is configured to perform various operations on pixel data having a pixel attribute.

The embodiments of the disclosure provide a PVS determining method and apparatus, a device, and a storage medium, which solve the problem in the related art that when a CPU performs pre-computation by randomly emitting rays and a quantity of the rays is not sufficient, there may be a visible object incorrectly determined as an invisible object because no ray hits the object, resulting in a miss in a final rendering result displayed in a camera lens.

FIG. 1 is a structural block diagram of a computer system 100 according to an example embodiment of the disclosure. The computer system 100 includes: a first terminal 110, a second terminal 130, and a server 120.

An application supporting a virtual environment is installed and run on the first terminal 110. When the first terminal 110 runs the application, a user interface (UI) 111 of the application is displayed on a screen of the first terminal 110. The application may be, for example, any one of a sports game, a vehicle simulation game, or an action game. The first terminal 110 is a terminal used by a first user 101, and the first user 101 uses the first terminal 110 to control a first virtual object located in the virtual environment to race. The first virtual object includes, but is not limited to, at least one of a racing automobile, a sport utility vehicle, a kart, a speeding vehicle, an aircraft, a motorbike, a mountain bike, and a virtual character. For example, the first virtual object is a first virtual vehicle, such as a simulated speeding vehicle or a simulated racing automobile.

An application supporting a virtual environment is installed and run on the second terminal 130. The application may be, for example, any one of a sports game, a vehicle simulation game, or an action game. When the second terminal 130 runs the application, a UI 131 of the application is displayed on a screen of the second terminal 130. The second terminal 130 is a terminal used by a second user 102, and the second user 102 uses the second terminal 130 to control a second virtual object located in the virtual environment to race. The second virtual object includes, but is not limited to, at least one of a racing automobile, a sport utility vehicle, a kart, a speeding vehicle, an aircraft, a motorbike, a mountain bike, and a virtual character. For example, the second virtual object is a second virtual vehicle, such as a simulated speeding vehicle or a simulated racing automobile.

Optionally, the first virtual object and the second virtual object are located in the same virtual environment. Optionally, the first virtual object and the second virtual object may belong to the same camp, the same team, or the same organization, have a friend relationship with each other, or have a temporary communication permission. Optionally, the first virtual object and the second virtual object may belong to different camps, different teams, or different organizations, or have a hostile relationship with each other.

Optionally, the applications installed on the first terminal 110 and the second terminal 130 are the same, or the applications installed on the two terminals are the same type of applications on different control system platforms. The first terminal 110 may generally refer to one of a plurality of terminals, and the second terminal 130 may generally refer to one of a plurality of terminals. In this embodiment, only the first terminal 110 and the second terminal 130 are used as an example for description. Device types of the first terminal 110 and the second terminal 130 are the same or different. The device type includes at least one of a desktop computer, a laptop computer, a mobile phone, a tablet computer, an ebook reader, a moving picture experts group audio layer III (MP3) player, and a moving picture experts group audio layer IV (MP4) player.

Another terminal 140 may be a terminal corresponding to a developer. A platform for developing and editing the application supporting the virtual environment is installed on the terminal 140. A developer may edit the application on the terminal 140 and transmit an edited application file to the server 120 through a wired or wireless network. The first terminal 110 and the second terminal 130 may download an update package corresponding to the application from the server 120 to update the application.

The first terminal 110, the second terminal 130, and the another terminal 140 are connected to the server 120 through a wireless network or a wired network.

The server 120 includes at least one of one server, a plurality of servers, a cloud computing platform, and a virtualization center. The server 120 is configured to provide a backend service for an application supporting a 3D virtual environment. Optionally, the server 120 takes on primary computing work, and the terminals take on secondary computing work. Alternatively, the server 120 takes on secondary computing work, and the terminals take on primary computing work. Alternatively, collaborative computing is performed by using a distributed computing architecture between the server 120 and the terminals.

It is to be understand that the terminals and the server mentioned in this embodiment of the disclosure may be used independently to execute the PVS determining method and/or the 3D scene rendering method provided in the embodiments of the disclosure. The terminals and the server may alternatively be used in cooperation to execute the PVS determining method and/or the 3D scene rendering method provided in the embodiments of the disclosure.

The server 120 includes at least one server module 121. The server module 121 includes a processor 122, a user database 123, an application database 124, a user-oriented input/output (I/O) interface 125, and a developer-oriented I/O interface 126. The processor 122 is configured to load instructions stored in the server module 121, and process data in the user database 123 and the application database 124. The user database 123 is configured to store user data uploaded by the first terminal 110 and/or the second terminal 130 through a wireless network or wired network. The application database 124 is configured to store data in the application of a 2.5-dimensional virtual environment. The user-oriented I/O interface 125 is configured to establish communication and exchange data with the first terminal 110 and/or the second terminal 130 through a wireless network or wired network. The developer-oriented I/O interface 126 is configured to establish communication and exchange data with the another terminal 140 through a wireless network or wired network.

A person skilled in the art would understand that there may be more or fewer terminals. For example, there may be only one terminal, or there may be dozens of or hundreds of terminals or more. The quantity and the device type of the terminals are not limited in the embodiments of the disclosure.

Figure 2:
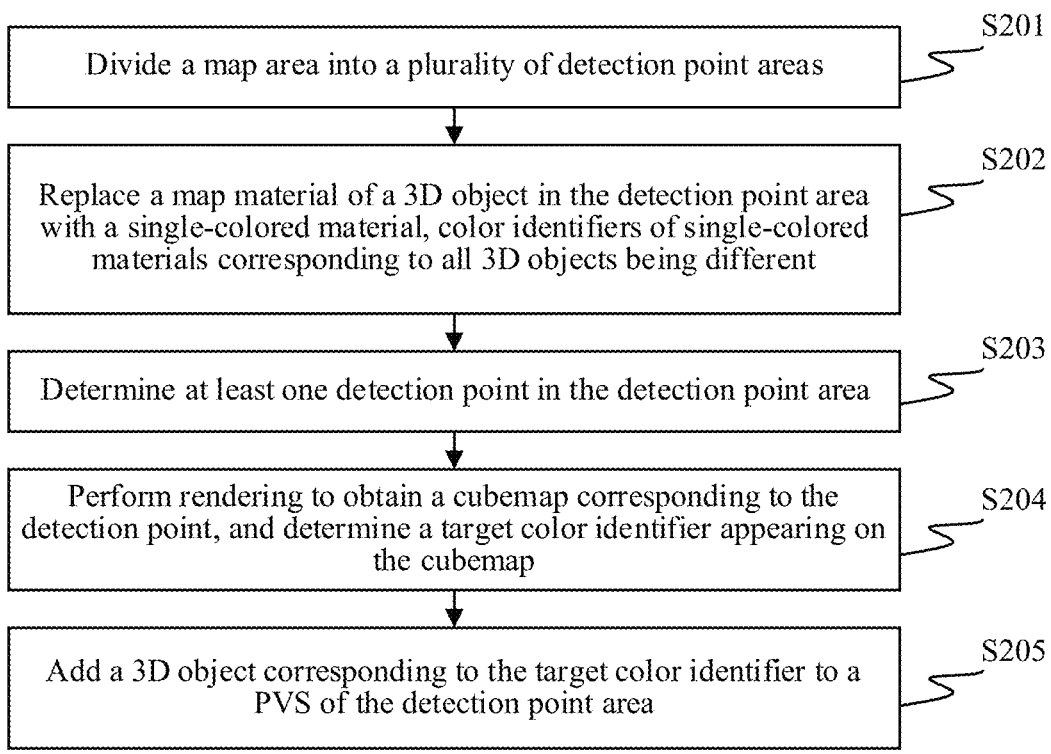
FIG. 2 is a flowchart of a potentially visible set (PVS) determining method according to an example embodiment of the disclosure.

FIG. 2 is a flowchart of a PVS determining method according to an example embodiment of the disclosure. The method is applicable to a computer device. The computer device may be the first terminal 110, the second terminal 130, the another terminal 140, or the server 120 in the computer system shown in FIG. 1. The method includes operations S201-S205:

Operation S201: Divide a map area into a plurality of detection point areas.

The map area is a movement range (or movable range) of a virtual object in a virtual environment. The map area includes an opaque object and a translucent object. The virtual object moves in the map area, and both the opaque object and the translucent object are visible objects. A processor of the computer device invokes a GPU by using a Draw Call to render the visible objects, so that the visible objects have a 3D effect when displayed. The opaque object in this embodiment is referred to as a 3D object, and the translucent object in this embodiment is referred to as a translucent 3D object.

In an example embodiment, the processor of the computer device divides the map area into a plurality of detection point areas according to a division rule. The detection point areas are convex quadrilateral areas obtained through division according to the division rule. The division rule includes at least one of division along a predetermined route that the virtual object travels and division according to a movement range of the virtual object.

Optionally, shapes of the plurality of detection point areas may be the same or different; sizes of the plurality of detection point areas may be equal or not equal; and quantities of detection point areas obtained by dividing different map areas may be the same or different.

Operation S202: Replace a map material of a 3D object in the detection point area with a single-colored material, color identifiers of single-colored materials corresponding to all of 3D objects included in the virtual environment being different.

The processor of the computer device uniquely identifies each 3D object in the detection point area, that is, each 3D object corresponds to a unique object identifier. The unique object identifier is used to identify the 3D object in the detection point area, and the processor determines the corresponding 3D object in a 3D virtual world according to the unique object identifier.

In an embodiment, the processor of the computer device maps the unique object identifier, to replace a map material of the 3D object in the detection point area with a single-colored material. Due to the uniqueness of the unique object identifier, color identifiers of single-colored materials corresponding to all the 3D objects included in the virtual environment are different. The color identifier is used to identify a single color corresponding to the single-colored material replacing the map material of the 3D object.

Operation S203: Determine at least one detection point in the detection point area.

In an example embodiment, the processor of the computer device sets a plurality of detection points in the detection point area. The detection point is a position point for monitoring a visible object. The plurality of detection points are different positions scattered in the detection point area.

Optionally, positions and a quantity of the detection points in the detection point area are not limited in this embodiment of the disclosure.

Operation S204: Perform rendering to obtain a cubemap corresponding to the detection point, and determine a target color identifier of a single color appearing on the cubemap.

In an example embodiment, the computer device may use the determined detection point as a position of a camera model. A camera lens performs rendering on each of six directional planes with respect to the detection point by rotating 90° each time at the detection point, to obtain a two-dimensional texture map. The processor of the computer device obtains a cubemap corresponding to the detection point according to the two-dimensional texture maps obtained by rendering the six directional planes. The processor performs visible detection on a 3D object according to the cubemap, and determines, by detecting the target color identifier on the cubemap, a single color that appears on the cubemap.

Operation S205: Add a 3D object corresponding to the target color identifier to a PVS of the detection point area.

In an example embodiment, the processor of the computer device determines the 3D object corresponding to the target color identifier according to the determined target color identifier on the cubemap, to determine a 3D object that may be seen by the camera lens when the camera model is formed at the detection point of the cubemap. The target color identifier is used to identify the 3D object present on the cubemap. The processor of the computer device adds the determined 3D object to the PVS of the detection point area, so that when running on a user side, the processor renders, according to a detected detection point area of the virtual environment in which a user is currently located, all visible objects in the detection point area. Therefore, the PVS is a set of all visible objects in the detection point area.

According to the method provided in this embodiment, a map area is divided into a plurality of detection point areas, a map material of a 3D object in the detection point area is replaced with a single-colored material, color identifiers of single-colored materials corresponding to all 3D objects included in the virtual environment being different, so that the 3D object in the detection point area has a unique identifier, then a target color identifier is determined on a cubemap corresponding to a determined detection point in the detection point area, and a 3D object corresponding to the target color identifier is added to a PVS of the detection point area, thereby determining a visible object on the cubemap. Compared to the related art method that uses a cubemap to render a distant scene such as sky to implement an effect of the distant scene, an example embodiment of the disclosure uses the cubemap to detect the visible object in the detection point area, so that the visible object at any angle in the detection point area may be detected by detecting the target color identifier on the six directional planes of the cubemap. Compared with the related art, the randomness and instability of randomly emitting rays are avoided, and the accuracy of visible object detection is ensured, so that a final result displayed in the PVS is accurate. In addition, the 3D object in the detection point area is replaced with a two-dimensional single color, which reduces an amount of calculation during detection.

Figure 3:
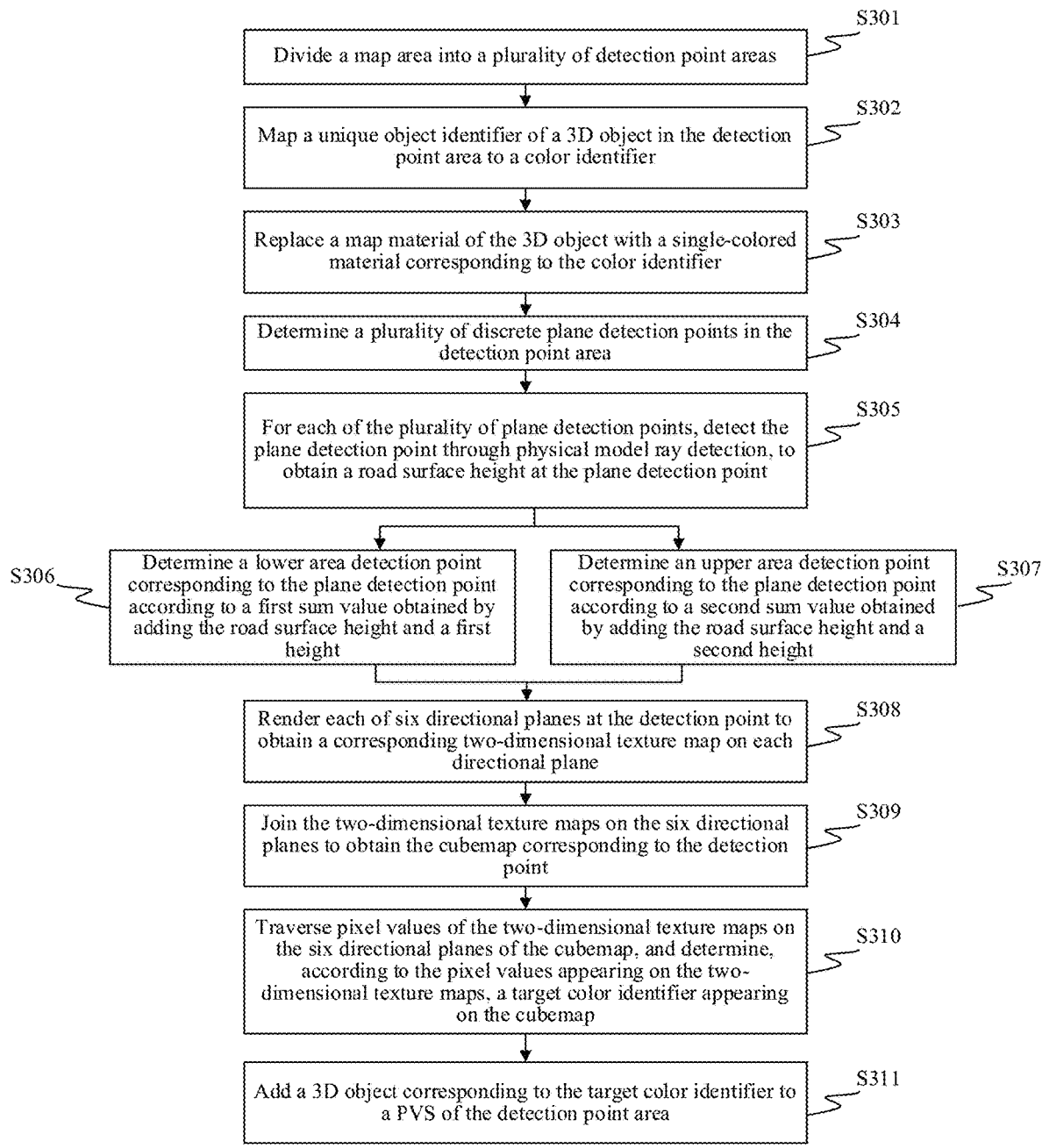
FIG. 3 is a flowchart of a PVS determining method according to another example embodiment of the disclosure.

FIG. 3 is a flowchart of a PVS determining method according to another example embodiment of the disclosure. The method is applicable to the computer system shown in FIG. 1. The method includes the following operations S301-S311:

Operation S301: Divide a map area into a plurality of detection point areas.

The map area is a movement range of a virtual object in a virtual environment. The map area includes an opaque object and a translucent object. The virtual object moves in the map area, and both the opaque object and the translucent object are visible objects. A processor of a computer device invokes a GPU by using a Draw Call to render the visible objects, so that the visible objects have a 3D effect when displayed. The opaque object in this embodiment is referred to as a 3D object, and the translucent object in this embodiment is referred to as a translucent 3D object.

In an example embodiment, the processor of the computer device divides the map area into a plurality of detection point areas according to a division rule. The detection point areas are convex quadrilateral areas obtained through division according to the division rule. The division rule includes at least one of division along a predetermined route that the virtual object travels and division according to a movement range of the virtual object.

Optionally, shapes of the plurality of detection point areas may be the same or different; sizes of the plurality of detection point areas may be equal or not equal; and quantities of detection point areas obtained by dividing different map areas may be the same or different.

Operation S302: Map a unique object identifier of the 3D object in the detection point area to a color identifier.

The unique object identifier is a unique identifier of each 3D object in the detection point area. The processor of the computer device uniquely identifies the 3D object in the detection point area by using the unique object identifier, that is, each 3D object in the detection point area corresponds to a unique object identifier, and the unique object identifier is not repeated. The unique object identifier is used to uniquely identify a 3D object a 3D scene.

Figure 4:
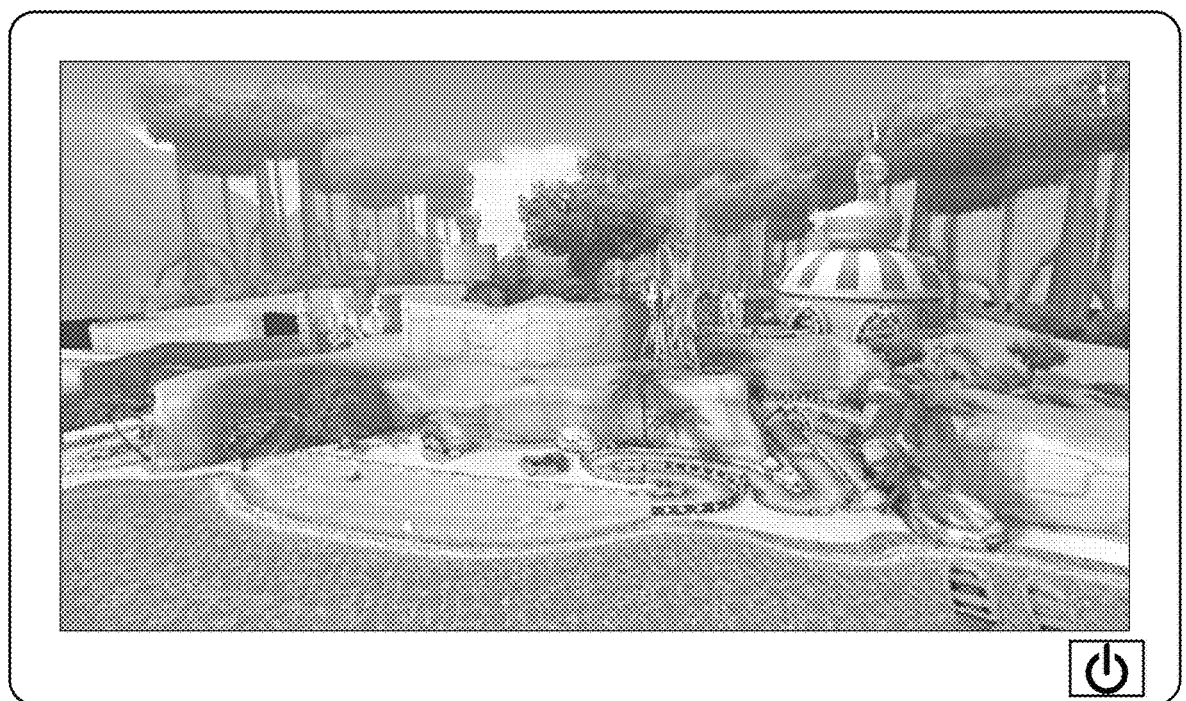
FIG. 4 is a schematic diagram of a three-dimensional (3D) object in a virtual environment according to another example embodiment of the disclosure.

FIG. 4 shows a 3D object in a virtual environment. After the 3D object in FIG. 4 is rendered by a GPU, a 3D effect is displayed, and each 3D object is a visible object. The processor reads a unique object identifier corresponding to each 3D object.

Figure 5:
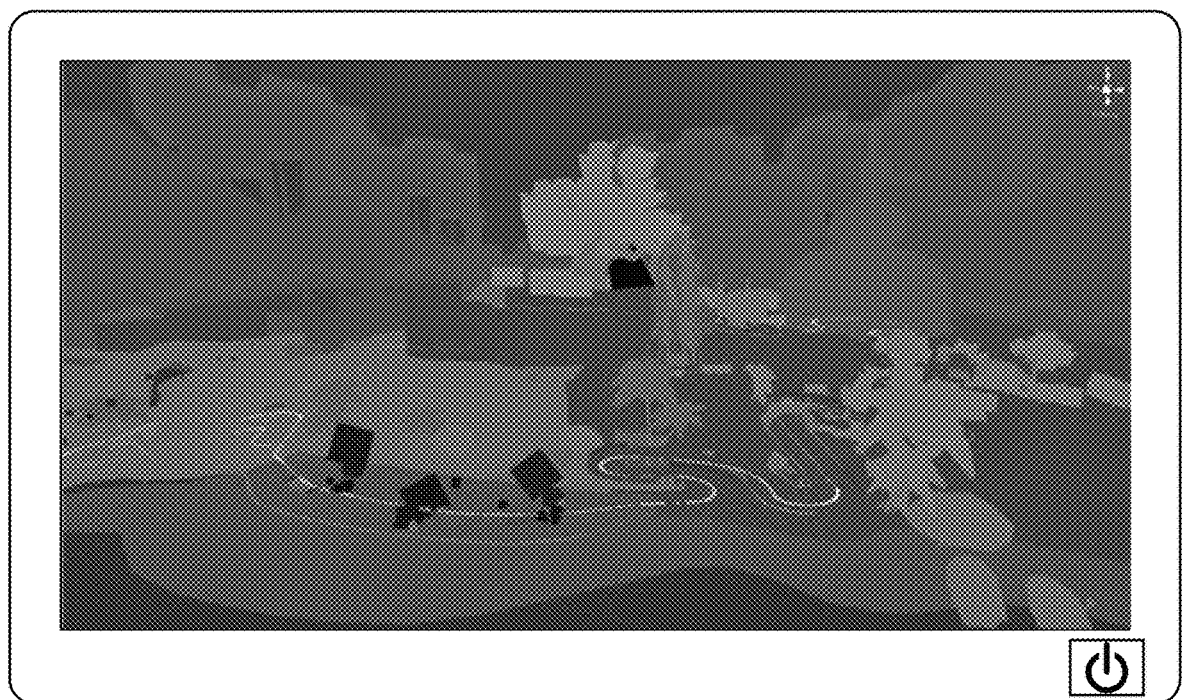
FIG. 5 is a schematic diagram of a mapped 3D object in a virtual environment according to another example embodiment of the disclosure.

In an optional implementation, when a quantity of visible objects in each detection point area in a map area shown in FIG. 4 does not exceed 255, the processor respectively maps the last three bits of the read unique object identifier of the 3D object in the detection point area to a red channel value, a green channel value, and a blue channel value in a red, green, and blue color space. After the map area shown in FIG. 4 is mapped, the processor obtains a mapped map shown in FIG. 5. With reference to analysis of visible objects in FIG. 4 and FIG. 5, it is found that each 3D object corresponds to a unique single color, that is, each 3D object obtains a different single color after the mapping, and each 3D object obtains a unique color identifier according to the different single color.

In an example, code for respectively mapping the last three bits of the unique object identifier of the 3D object to the red channel value, the green channel value, and the blue channel value is as follows:

The processor of the computer device determines the color identifier corresponding to the 3D object according to the red channel value, the green channel value, and the blue channel value. The color identifier is used to identify the 3D object in the detection point area according to the uniqueness of the color identifier.

Operation S303: Replace a map material of the 3D object with a single-colored material corresponding to the color identifier.

The color identifier is a unique identifier obtained after mapping the unique object identifier of the 3D object. In an embodiment, the color identifier includes a red channel value, a green channel value, and a blue channel value. The single-colored material is a material corresponding to a single color synthesized according to the red channel value, the green channel value, and the blue channel value.

Operation S304: Determine a plurality of discrete plane detection points in the detection point area.

In an optional implementation, the processor of the computer device determines positions of interpolations as a plurality of discrete plane detection points by performing the interpolations on a plane of the detection point area.

In an embodiment, the processor of the computer device obtains a plurality of plane detection points equally distributed on the plane of the detection point area by performing equal interpolations on the plane of the detection point area.

A method of determining a plurality of plane detection points in the detection point area, and a quantity of the plane detection points determined in the detection point area are not specifically limited in the disclosure.

Operation S305: For each of the plurality of plane detection points, detect the plane detection point through physical model ray detection, to obtain a road surface height at the plane detection point.

In an example embodiment, for each of the plurality of plane detection points, the processor of the computer device performs collision detection on each plane detection point through physical model ray detection. The plurality of plane detection points in the detection point area are on the same horizontal line. The processor of the computer device determines at least one plane detection point, emits a ray in a vertical downward direction at the plane detection point, and determines a road surface height at the plane detection point according to a collision point at which the emitted ray collides with a road surface.

Figure 6:
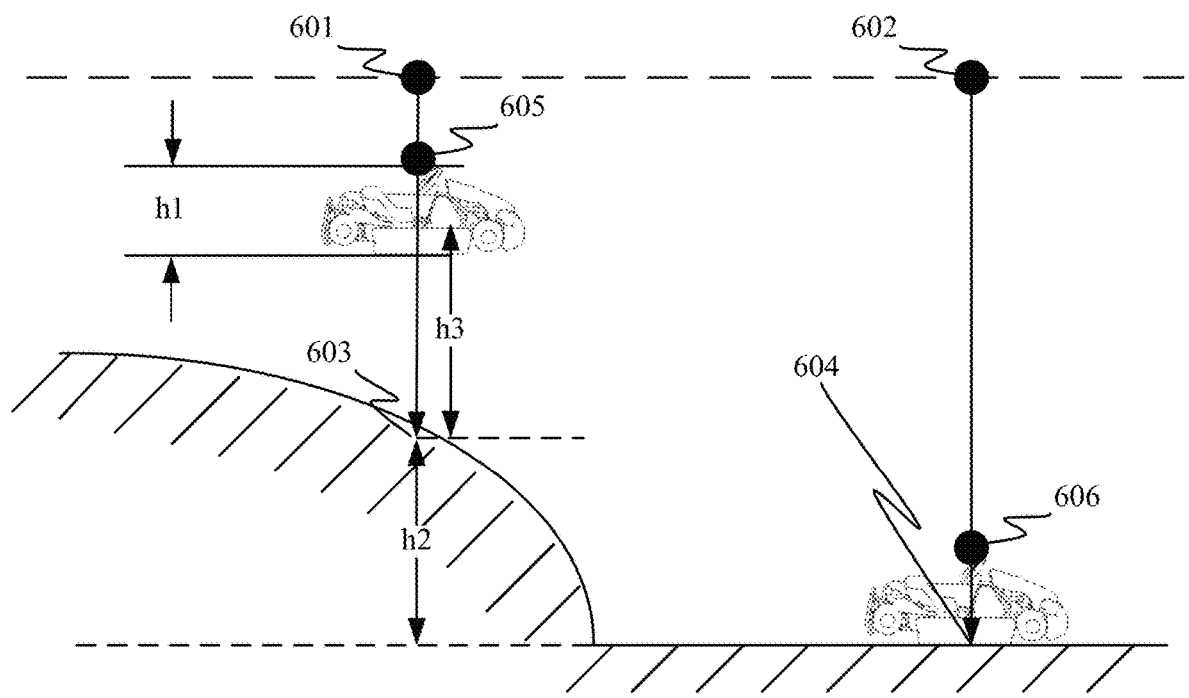
FIG. 6 is a schematic diagram of a road surface height at a plane detection point according to another example embodiment of the disclosure.

For example, FIG. 6 shows a schematic diagram of performing collision detection on a plane detection point to obtain a road surface height. FIG. 6 includes a first plane detection point 601 and a second plane detection point 602, and the first plane detection point 601 and the second plane detection point 602 are on the same horizontal line.

The processor of the computer device performs collision detection through physical model ray detection at the first plane detection point 601. A ray is emitted in the vertical

```
Color ID2Color(int i)       //i is a unique object identifier
{
    int mEncodeFactor = 10;
    int mEncodeMultiply = 256/10;
    Color res = new Color(mEncodeMultiply * (i % mEncodeFactor) /
255.0f, mEncodeMultiply * ((i / mEncodeFactor) % mEncodeFactor) / 255.0f,
mEncodeMultiply * (i / mEncodeFactor / mEncodeFactor) / 255.0f, 1.0f); //
mEncodeMultiply * (i % mEncodeFactor) / 255.0f is a red channel value, mEncodeMultiply *
((i / mEncodeFactor) % mEncodeFactor) / 255.0f is a green channel value, mEncodeMultiply
* (i / mEncodeFactor / mEncodeFactor) / 255.0f is a blue channel value
    return res;        //res is a color identifier
}
``` downward direction from the first plane detection point 601. The processor obtains a collision point 603 of the first plane detection point 601, and determines a road surface height h2 of the first plane detection point 601 according to the collision point 603 the first plane detection point 601.

The processor of the computer device performs collision detection through physical model ray detection at the second plane detection point 602. A ray is emitted in the vertical downward direction from the second plane detection point 602. The processor of the computer device obtains a collision point 604 of the second plane detection point 602, and determines a road surface height h4 (not shown in the figure) of the second plane detection point 602 according to the collision point 604 the second plane detection point 602. In FIG. 6, the road surface height h4 at the second plane detection point 602 is 0, that is, a road surface at the second plane detection point 602 is a flat road.

In an embodiment, the plane detection points are several detection points uniformly distributed in the detection point area.

Operation S306: Determine a lower area detection point corresponding to the plane detection point according to a first sum value obtained by adding the road surface height and a first height.

The first height is a height of a virtual object in a moving state. In an embodiment, the processor of the computer device adds the detected road surface height at the plane detection point and the first height, to obtain the first sum value. The first sum value is a height value in a state in which the virtual object is moving on the road surface. The processor of the computer device determines a plane detection point corresponding to the first sum value as a lower area detection point according to the first sum value. The lower area detection point is a detection point at which the virtual object is moving on the road surface.

Referring to FIG. 6, a height of a virtual object 605 that is moving is h1, and the road surface height h4 at the second plane detection point 602 is 0. When the virtual object 605 races to a road surface corresponding to the second plane detection point 602, the virtual object 605 is on the road surface. Therefore, a first height is the height h1 of the virtual object 605. The processor adds h1 (the first height) and h4 (the road surface height) to obtain a first sum value, that is, h1+h4, and determines a lower area detection point 606 corresponding to the second plane detection point 602 according to the first sum value.

In an embodiment, lower area detection points are several detection points uniformly distributed in the detection point area.

Operation S307: Determine an upper area detection point corresponding to the plane detection point according to a second sum value obtained by adding the road surface height and a second height.

The second height is a sum of a height of a virtual object in a moving state and a height at which the virtual object is moving above the road surface. In an embodiment, the processor of the computer device adds the detected road surface height at the plane detection point and the second height, to obtain the second sum value. The second sum value is a height value in a state in which the virtual object is moving above the road surface. The processor of the computer device determines a plane detection point corresponding to the second sum value as an upper area detection point according to the second sum value. The upper area detection point is a detection point at which the virtual object is moving above the road surface.

Referring to FIG. 6, the height of the virtual object 605 that is moving is h1, and the road surface height at the first plane detection point 601 is h2. When the virtual object 605 races to a road surface corresponding to the first plane detection point 601, the virtual object 605 is moving above the road surface, and a height above the road surface is h3. Therefore, a second height is a sum of the height h1 of the virtual object 605 and the height h3 above the road surface. The processor adds the second height and h2 (the road surface height) to obtain a second sum value, that is, h1+h3+h2, and determines an upper area detection point 605 corresponding to the first plane detection point 601 according to the second sum value.

In an embodiment, upper area detection points are several detection points uniformly distributed in the detection point area.

Operation S308: Render each of six directional planes at the detection point to obtain a corresponding two-dimensional texture map on each directional plane.

In an embodiment, the processor of the computer device performs two-dimensional rendering on each of six directional planes at the lower area detection point: a front plane, a back plane, a left plane, a right plane, a bottom plane, and a top plane, to obtain six two-dimensional texture maps. The six two-dimensional texture maps correspond to the six directional planes at the lower area detection point. The processor of the computer device performs two-dimensional rendering on each of six directional planes at the upper area detection point, to obtain six two-dimensional texture maps. The six two-dimensional texture maps correspond to the six directional planes at the upper area detection point.

Figure 7:
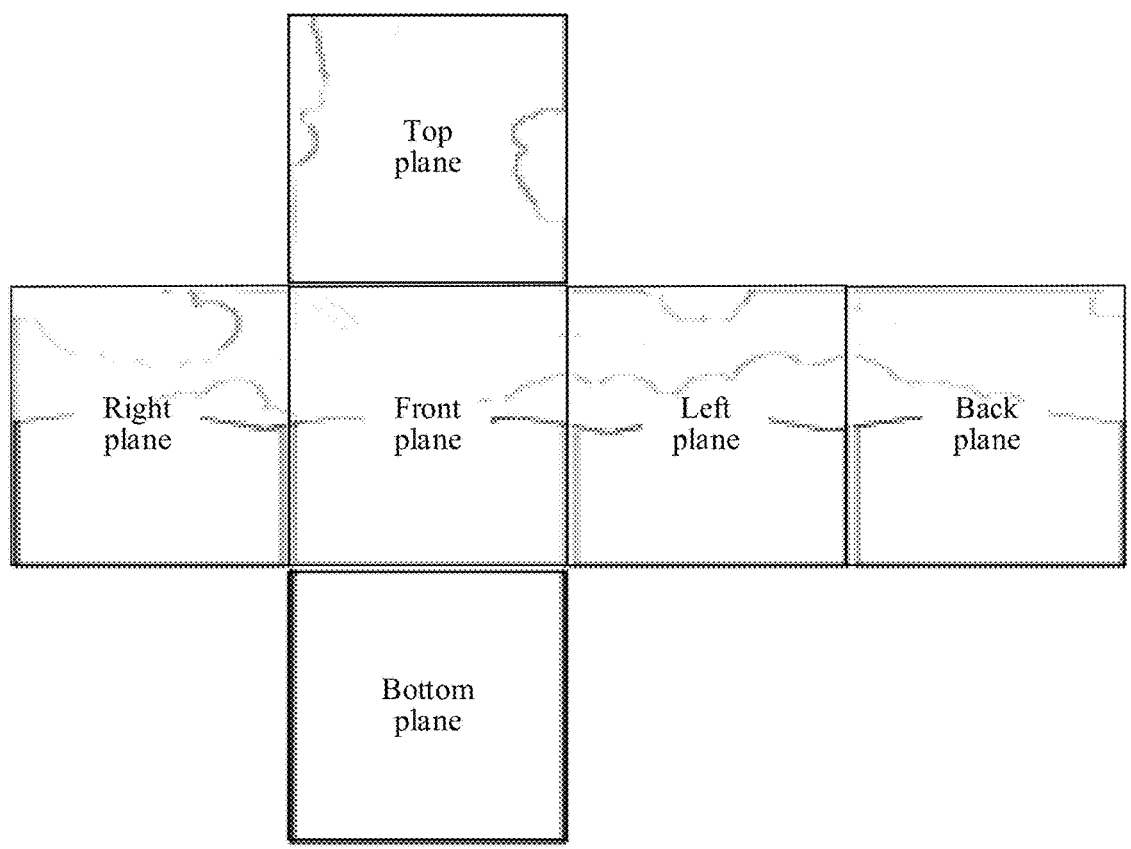
FIG. 7 is a schematic diagram of two-dimensional texture maps at a detection point according to another example embodiment of the disclosure.

For example, FIG. 7 shows two-dimensional texture maps obtained by the processor of the computer device after performing two-dimensional rendering at a determined detection point. The detection point may be a lower area detection point or an upper area detection point. The processor of the computer device performs, by using the detection point as a camera model, two-dimensional rendering on each of six directional planes at the lower area detection point: a front plane, a back plane, a left plane, a right plane, a bottom plane, and a top plane, to obtain two-dimensional texture maps on the six directional planes at the detection point.

Operation S309: Join the two-dimensional texture maps on the six directional planes to obtain the cubemap corresponding to the detection point.

In an example embodiment, the processor of the computer device joins the six obtained two-dimensional texture maps on the six directional planes at the lower area detection point, to obtain a cubemap corresponding to the lower area detection point. In an example embodiment, the processor of the computer device joins the six obtained two-dimensional texture maps on the six directional planes at the upper area detection point, to obtain a cubemap corresponding to the upper area detection point.

Referring to FIG. 7, the processor of the computer device joins the two-dimensional texture maps on the six directional planes at the detection point, to obtain a cubemap corresponding to the detection point.

Operation S310: Traverse pixel values of the two-dimensional texture maps on the six directional planes of the cubemap, and determine, according to the pixel values appearing on the two-dimensional texture maps, a target color identifier of a single color appearing on the cubemap.

The target color identifier is a color identifier of a single color appearing on the cubemap corresponding to the detection point.

In an embodiment, the processor of the computer device traverses pixel values of the two-dimensional texture maps on the six directional planes of the cubemap corresponding to the lower area detection point, and determines, according to the pixel values appearing on the two-dimensional texture maps, a single color belonging to the pixel values, to determine a target color identifier of a single color appearing on the cubemap corresponding to the lower area detection point.

In an embodiment, the processor of the computer device traverses pixel values of the two-dimensional texture maps on the six directional planes of the cubemap corresponding to the upper area detection point, and determines, according to the pixel values appearing on the two-dimensional texture maps, a single color belonging to the pixel values, to determine a target color identifier of a single color appearing on the cubemap corresponding to the upper area detection point.

Operation S311: Add a 3D object corresponding to the target color identifier to a PVS of the detection point area.

The target color identifier is used to determine the 3D object present on the cubemap corresponding to the detection point.

In an embodiment, the PVS of the detection point area includes a first PVS and a second PVS.

The processor of the computer device determines, according to the target color identifier on the cubemap corresponding to the lower area detection point, a 3D object corresponding to the target color identifier, and adds the 3D object to the first PVS of the detection point area. The processor of the computer device determines, according to the target color identifier on the cubemap corresponding to the upper area detection point, a 3D object corresponding to the target color identifier, and adds the 3D object to the second PVS of the detection point area.

In an embodiment, the first PVS and the second PVS are combined into one PVS.

According to the method provided in this embodiment, a map area is divided into a plurality of detection point areas, a map material of a 3D object in the detection point area is replaced with a single-colored material, color identifiers of single-colored materials corresponding to all of 3D objects included in the virtual environment being different, so that the 3D object in the detection point area has a unique identifier, then a target color identifier is determined on a cubemap corresponding to a determined detection point in the detection point area, and a 3D object corresponding to the target color identifier is added to a PVS of the detection point area, thereby determining a visible object on the cubemap. Compared to the related art method that uses a cubemap to render a distant scene such as sky to implement an effect of the distant scene, an example embodiment of the disclosure uses the cubemap to detect the visible object in the detection point area, so that the visible object at any angle in the detection point area may be detected by detecting the target color identifier on the six directional planes of the cubemap. Compared with the related art, the randomness and instability of randomly emitting rays are avoided, and the accuracy of visible object detection is ensured, so that a final result displayed in the PVS is accurate. In addition, the 3D object in the detection point area is replaced with a two-dimensional single color, which reduces an amount of calculation during detection.

According to the method provided in this embodiment, two-dimensional rendering is performed on each of six directional planes at a detection point to obtain a corresponding two-dimensional texture map on each directional plane, and a cubemap corresponding to the detection point is obtained by joining the six two-dimensional texture maps. Compared with 3D rendering, a GPU consumes less for the two-dimensional rendering. Visible detection is performed on a 3D object on the cubemap by determining a target color identifier on the cubemap.

According to the method provided in this embodiment, a color identifier corresponding to a 3D object is obtained by respectively mapping the last three bits of a unique object identifier of the 3D object to a red channel value, a green channel value, and a blue channel value in a red, green, and blue color space, and color identifiers of all 3D objects are different. The uniqueness of each 3D object is ensured, so that the problem occurring when identical color identifiers are used for 3D objects that leads to an incorrect visible detection result of a 3D object is avoided during visible detection according to an example embodiment.

According to the method provided in this embodiment, detection points in a detection point area are classified into a lower area detection point and an upper area detection point. A 3D object at the lower area detection point is added to a first PVS, and a 3D object at the upper area detection point is added to a second PVS. Therefore, when operating a virtual object to move, a user may realistically feel two states of moving on a road surface and moving above a road surface.

Figure 8:
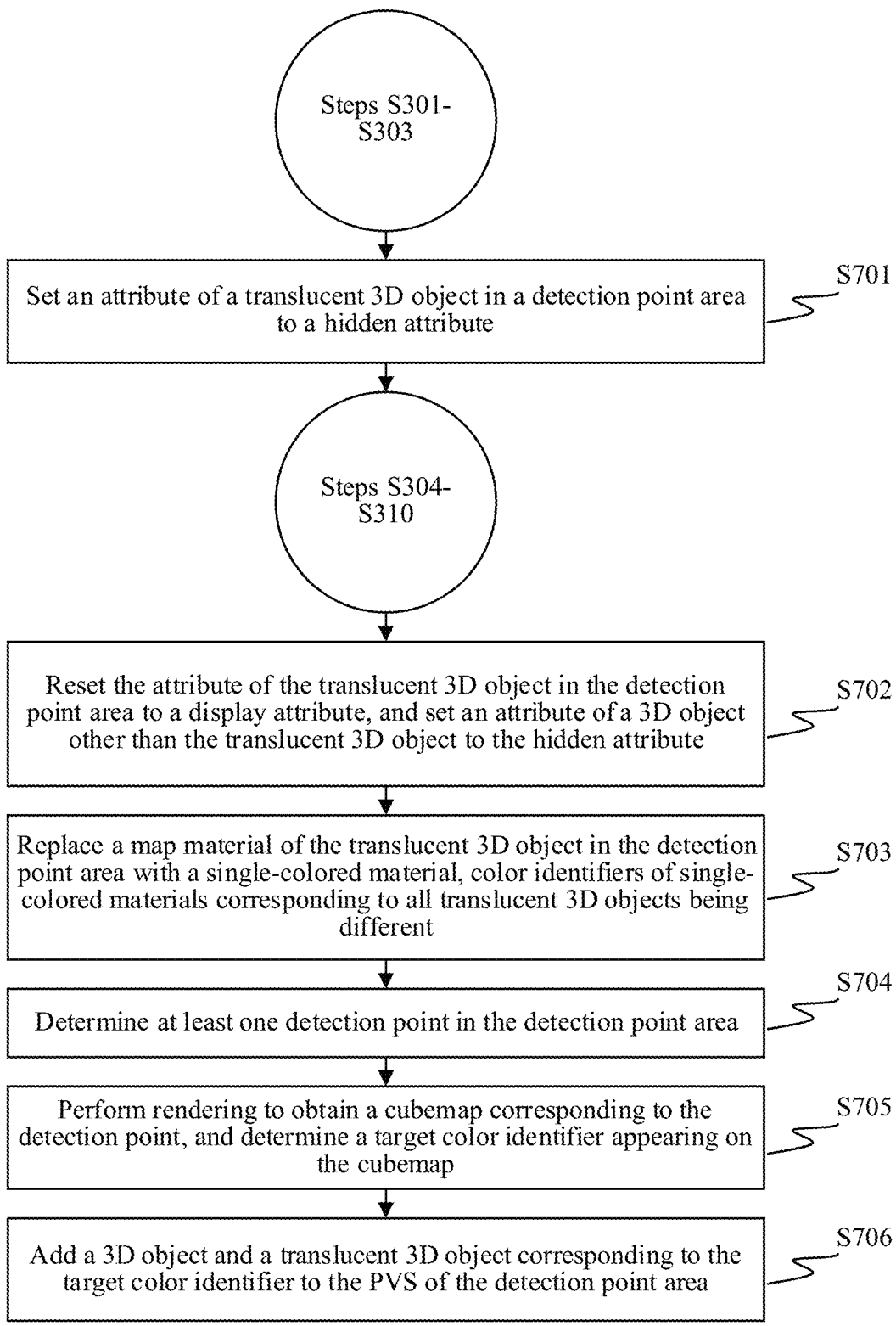
FIG. 8 is a flowchart of a visible detection method for a translucent 3D object according to another example embodiment of the disclosure.

In a process of visible detection, a developer first performs visible detection on an opaque object, namely, a 3D object, then performs visible detection on a translucent object, namely, is a translucent 3D object, to prevent a part of a color of the 3D object from being changed by the translucent 3D object. Therefore, the developer first hides the translucent 3D object, and then detects the translucent 3D object after the visible detection of the 3D object is completed. Based on the method shown in FIG. 3, FIG. 8 is an example flowchart of a visible detection method for a translucent 3D object. The method is applicable to the computer system shown in FIG. 1. The method includes the following operations S701-S706:

Operation S701: Set an attribute of a translucent 3D object in the detection point area to a hidden attribute.

The translucent 3D object is a 3D object having transmittance relative to the 3D object. In other words, through the translucent 3D object, a 3D object behind the translucent 3D object may be visually seen, or the translucent 3D object cannot occlude the 3D object, but may be occluded by the 3D object.

In an embodiment, after operations S301 to S303 shown in FIG. 3, the processor of the computer device sets an attribute of the translucent 3D object in the detection point area to the hidden attribute, and a display attribute of the 3D object other than the translucent 3D object (e.g., opaque 3D object) in the detection point area remains unchanged, so that the translucent 3D object is invisible in the detection point area, and the 3D object is visible in the detection point area.

Operation S702: Reset the attribute of the translucent 3D object in the detection point area to the display attribute, and set an attribute of a 3D object other than the translucent 3D object to the hidden attribute.

After operation S304 to operation S310 shown in FIG. 3, the processor of the computer device performs visible detection on the translucent 3D object, and determines the translucent 3D object in the detection point area. The processor of the computer device resets the attribute of the translucent 3D object in the detection point area from the hidden attribute to the display attribute, and sets the attribute of the 3D object (that is, the opaque object) from the display attribute to the hidden attribute, so that the translucent 3D object is visible in the detection point area, and the opaque 3D object is invisible in the detection point area.

Operation S703: Replace a map material of the translucent 3D object in the detection point area with a single-colored material, color identifiers of single-colored materials corresponding to all of translucent 3D objects included in the virtual environment being different.

Each translucent 3D object has a unique object identifier, and the color identifier is a unique identifier obtained after mapping the unique object identifier of the translucent 3D object. The single-colored material is a material corresponding to a single color synthesized according to the red channel value, the green channel value, and the blue channel value. The unique object identifiers of all the translucent 3D objects are different, so that color identifiers of single-colored materials obtained after mapping according to the unique object identifiers are different.

Operation S704: Determine at least one detection point in the detection point area.

Operation S705: Perform rendering to obtain a cubemap corresponding to the detection point, and determine a target color identifier of a single color appearing on the cubemap.

Example implementations of operation S703 to operation S705 in this embodiment is described in the method shown in FIG. 3. Details are not described herein again.

Operation S706: Add an opaque 3D object and a translucent 3D object corresponding to the target color identifier to the PVS of the detection point area.

The target color identifier is used to determine the translucent 3D object present on the cubemap corresponding to the detection point. The PVS of the detection point area includes a first PVS and a second PVS.

In an embodiment, the processor of the computer device determines, according to a target color identifier on a cubemap corresponding to a lower area detection point, a translucent 3D object corresponding to the target color identifier, and adds the translucent 3D object to the first PVS of the detection point area. The processor of the computer device determines, according to a target color identifier on a cubemap corresponding to an upper area detection point, a translucent 3D object corresponding to the target color identifier, and adds the translucent 3D object to the second PVS of the detection point area.

In an embodiment, the processor of the computer device adds an opaque 3D object and a translucent 3D object determined at a lower area detection point according to a target color identifier to the first PVS of the detection point area; and adds an opaque 3D object and a translucent 3D object determined at an upper area detection point according to a target color identifier to the second PVS of the detection point area.

In the method provided in this embodiment, the processor of the computer device first renders the opaque 3D object and then renders the translucent 3D object, to avoid repeated rendering caused by first rendering the translucent 3D object and then rendering the opaque 3D object. Furthermore, when processing an image, an art designer may find a problem that a part of the material of the 3D object changes due to existence of the translucent 3D object, and the art designer may resolve the problem to ensure that a final result displayed in the PVS conforms to a 3D effect.

In this embodiment, for example, a provided virtual environment is applicable to a 3D racing game. A PVS is determined in the 3D racing game. The 3D racing game may be any one of a sports game, a vehicle simulation game, or an action game. The 3D racing game includes a plurality of tracks, and a plurality of virtual objects race along the tracks. The virtual object is a position of a camera model, and at least one of visible objects such as a mountain, a sea, a flower, a tree, a house, and a tunnel is displayed in a lens picture of the camera model. Therefore, a track area includes the plurality of tracks and visible objects distributed along the tracks.

Figure 9:
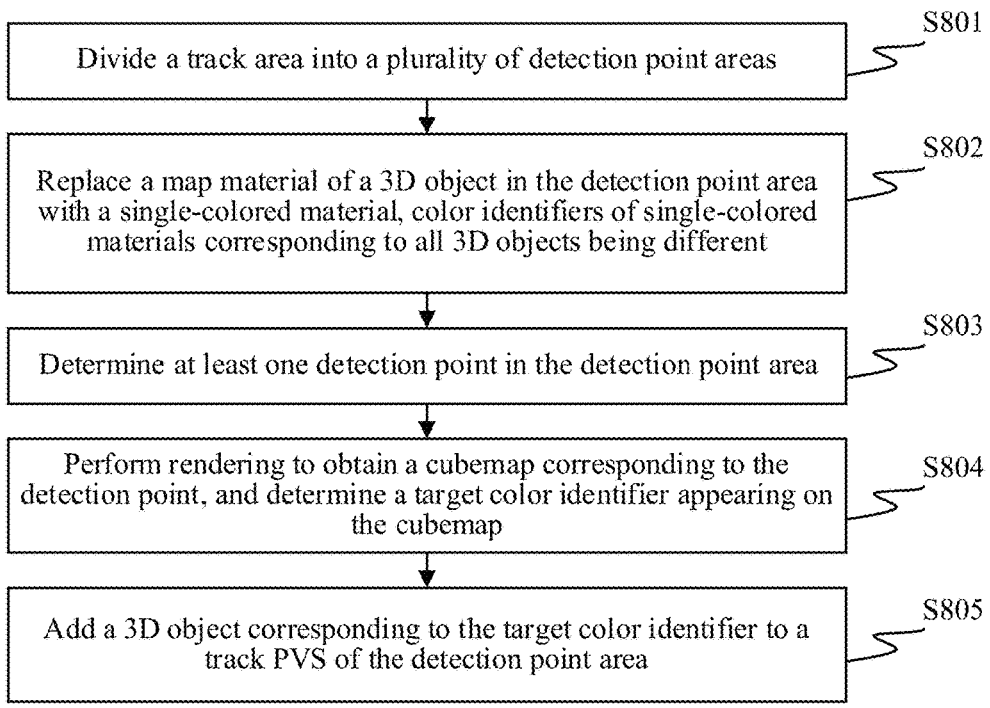
FIG. 9 is a flowchart of a PVS determining method according to another example embodiment of the disclosure.

FIG. 9 is a flowchart of a PVS determining method according to another example embodiment of the disclosure. The method is applicable to a 3D racing game, and the 3D racing game includes a track area located in a virtual environment. The method is applicable to the computer system shown in FIG. 1, and the method includes the following operations S801-S805:

Operation S801: Divide the track area into a plurality of detection point areas.

The track area is a racing range of a virtual object in the virtual environment. The track area includes a track route, an opaque object, and a translucent object. The track route is a predetermined route for the virtual object to race. Both the opaque object and the translucent object are distributed along the track route, and both the opaque object and the translucent object are visible objects. A processor of a computer device invokes a GPU by using a Draw Call to render the visible objects, so that the visible objects have a 3D effect when displayed. The opaque object in this embodiment is referred to as a 3D object, and the translucent object in this embodiment is referred to as a translucent 3D object.

Optionally, the 3D object may be a visible object such as a flower, a tree, a mountain, a house, a sea, or a cartoon character, and the translucent 3D object may be a visible object such as a smog, a nitrogen gas jet, or a splashed water drop.

In an embodiment, the processor of the computer device divides a map area into a plurality of detection point areas according to a track route in a track area. The detection point areas are convex quadrilateral areas obtained through division according to the track route in the track area.

Optionally, shapes of the plurality of detection point areas may be the same or different; sizes of the plurality of detection point areas may be equal or not equal; and quantities of detection point areas obtained by dividing different map areas may be the same or different.

Operation S802: Replace a map material of a 3D object in the detection point area with a single-colored material, color identifiers of single-colored materials corresponding to all 3D objects included in the virtual environment being different.

Operation S803: Determine at least one detection point in the detection point area.

Operation S804: Perform rendering to obtain a cubemap corresponding to the detection point, and determine a target color identifier of a single color appearing on the cubemap.

The content of operation S802 to operation S804 is the same as the content shown in FIG. 2 and FIG. 3. Details are not described herein again.

Operation S805: Add a 3D object corresponding to the target color identifier to a track PVS of the detection point area.

In an embodiment, the processor of the computer device determines, according to the determined target color identifier, the 3D object corresponding to the target color identifier. The processor adds the determined 3D object to the track PVS of the detection point area, so that when running on a user side, the processor renders, according to a detected detection point area of the virtual environment in which a user is currently located, all visible objects in the detection point area. Therefore, the track PVS is a set of visible objects distributed along the track route and located in the detection point area.

In an embodiment, after operation S802, the processor hides a translucent 3D object; and after operation S805, the processor displays the translucent 3D object, and then repeats operation S803 to operation S805 with respect to the translucent 3D object. The processor of the computer device first renders the 3D object and then renders the translucent 3D object, to avoid repeated rendering caused by first rendering the translucent 3D object and then rendering the 3D object. Furthermore, when processing an image, an art designer may find a problem that a part of the material of the 3D object changes due to existence of the translucent 3D object, and the art designer may resolve the problem to ensure that a final result displayed in the PVS conforms to a 3D effect.

After a developer performs visible detection on the 3D object and the translucent 3D object, a PVS of each detection point area in the map area is determined. The art designer needs to perform art processing on the PVS of the detection point area obtained by the developer, to ensure the accuracy of a final result displayed in the PVS.

Figure 10:
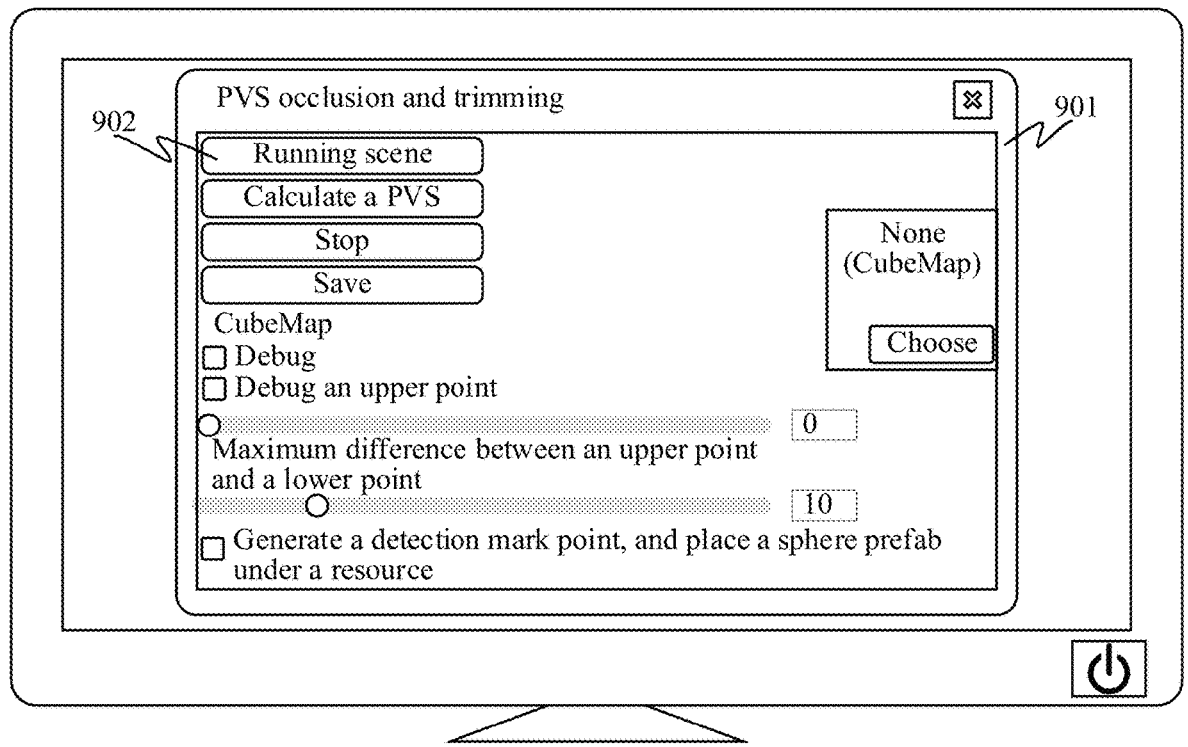
FIG. 10 is a schematic diagram of a first dialog box according to another example embodiment of the disclosure.

The processor runs a program, and a first dialog box 901 shown in FIG. 10 is displayed in an interface of a terminal. The first dialog box 901 is PVS occlusion and trimming. After determining that a button of a running scene 902 in the PVS occlusion and trimming 901 is clicked/tapped, the processor automatically runs the map area, and calculates the PVS of each detection point area in the map area. The processor stores the calculated PVS of the detection point area.

Figures 11, 12:
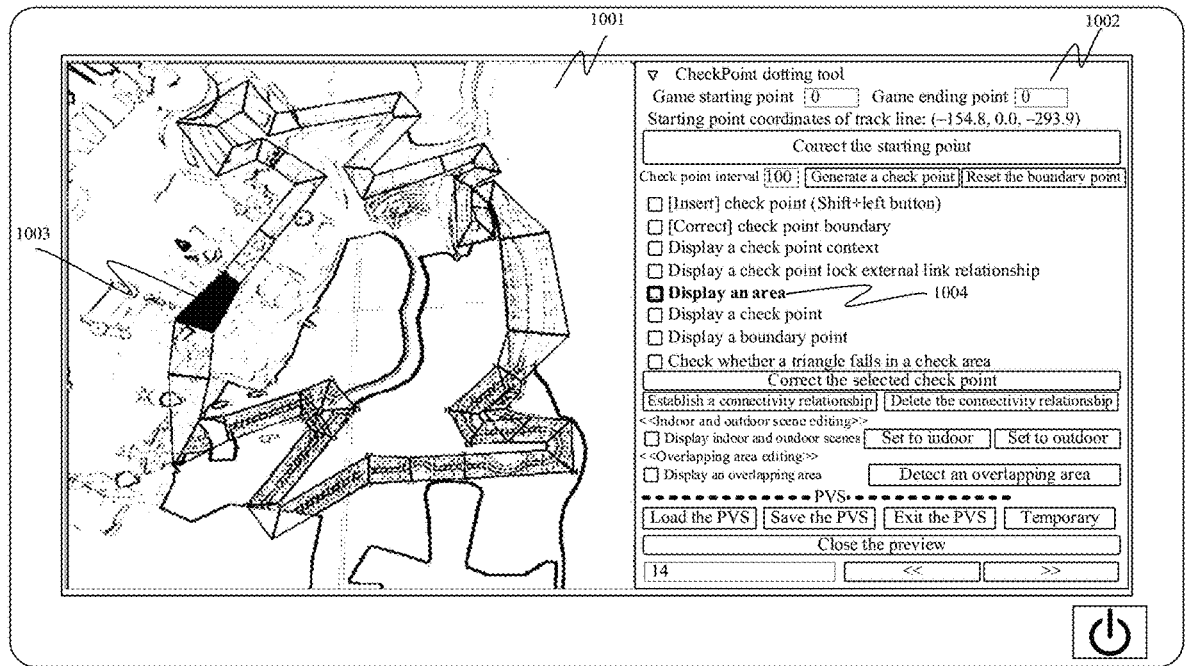
FIG. 11 is a schematic diagram of a second dialog box according to another example embodiment of the disclosure.
FIG. 12 is a schematic diagram of a third dialog box according to another example embodiment of the disclosure.

The processor runs a program of a track editor, and a second dialog box shown in FIG. 11 is displayed in the interface of the terminal. The second dialog box is a track editor. The processor imports the calculated PVS of the detection point area into the track editor. The track editor includes an area 1001, which includes a map area that is divided into a plurality of detection point areas, and a manual adjustment area 1002. After detecting that the art designer selects a target detection point area 1003 in the map area, and the art designer selects a check box of "Display an area" 1004 in the manual adjustment area 1002, the processor determines that the art designer needs to manually adjust a PVS of the target detection point area 1003, and the processor displays the PVS of the target detection point area 1003. The art designer enhances culling of a visible object in the PVS of the target detection point area within an art-allowed effect range, and resolves, according to an art effect, a problem that a part of a material of a 3D object changes due to existence of a translucent 3D object.

The processor of the computer device runs a program of a Draw Call monitor, and a third dialog box 1101 shown in FIG. 12 is displayed in the interface of the terminal. The third dialog box 1101 is the Draw Call monitor. After detecting that the art designer selects a check box of a scene 1102 in the Draw Call monitor 1101, the processor determines to automatically run a map in the map area. In a process of automatically running the map, the processor of the computer device monitors consumption on the PVS of the detection point area that is rendered by the GPU by using the Draw Call, and issues an alarm for a detection point area causing excessive consumption, to prompt the art designer to manually cull the detection point area causing excessive consumption.

By repeating the foregoing operations, the Draw Call monitor 1101 no longer issues an alarm in the process of automatically running the map, and the art designer determines that the manual adjustment part is completed.

In the method provided in this embodiment, the 3D object is first rendered and then the translucent 3D object is rendered, to avoid repeated rendering caused by first rendering the translucent 3D object and then rendering the 3D object. Furthermore, when processing an image, an art designer may find a problem that a part of the material of the 3D object changes due to existence of the translucent 3D object, and the art designer may resolve the problem to ensure that a final result displayed in the track PVS conforms to a 3D effect.

The developer obtains the track PVS of the detection point area of the 3D racing game based on the method shown in FIG. 9, and packages the track PVS of the detection point area in each track area into a compressed package and stores the compressed package in a server. A user who is to play the 3D racing game downloads the compressed package from the server. The server detects a position of a current frame of a camera model of a user terminal, reads a track PVS of a detection point area in which the camera model is located in the current frame, and performs 3D rendering on the read track PVS.

Figure 13:
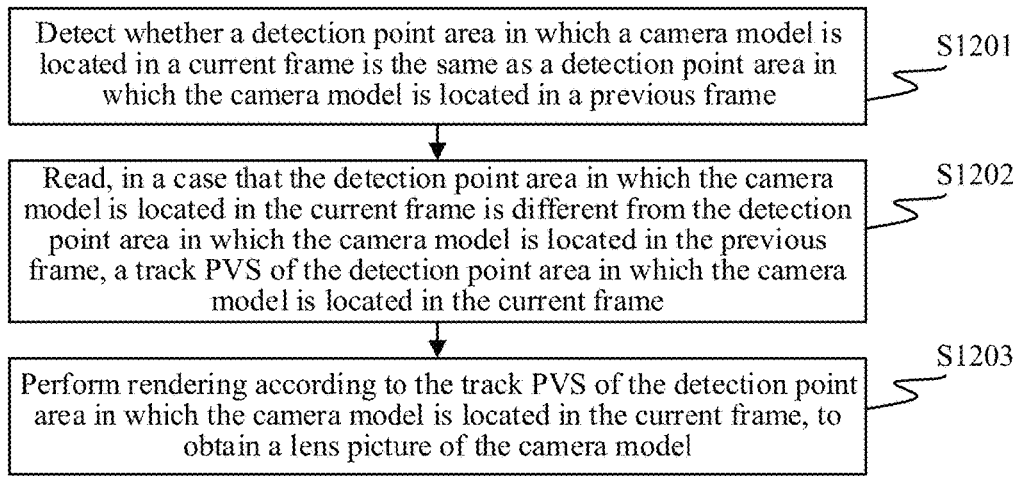
FIG. 13 is a flowchart of a 3D scene rendering method according to an example embodiment of the disclosure.

FIG. 13 is a flowchart of a 3D scene rendering method according to an example embodiment of the disclosure. For example, a provided virtual environment is applicable to a 3D racing game. The method is applicable to a computer device storing a detection point area and a PVS, and the PVS is obtained by using the method described above. The method is applicable to the computer system shown in FIG. 1, and the method includes the following operations S1201-S1203:

Operation S1201: Detect whether a detection point area in which a camera model is located in a current frame is the same as a detection point area in which the camera model is located in a previous frame.

Figure 14:
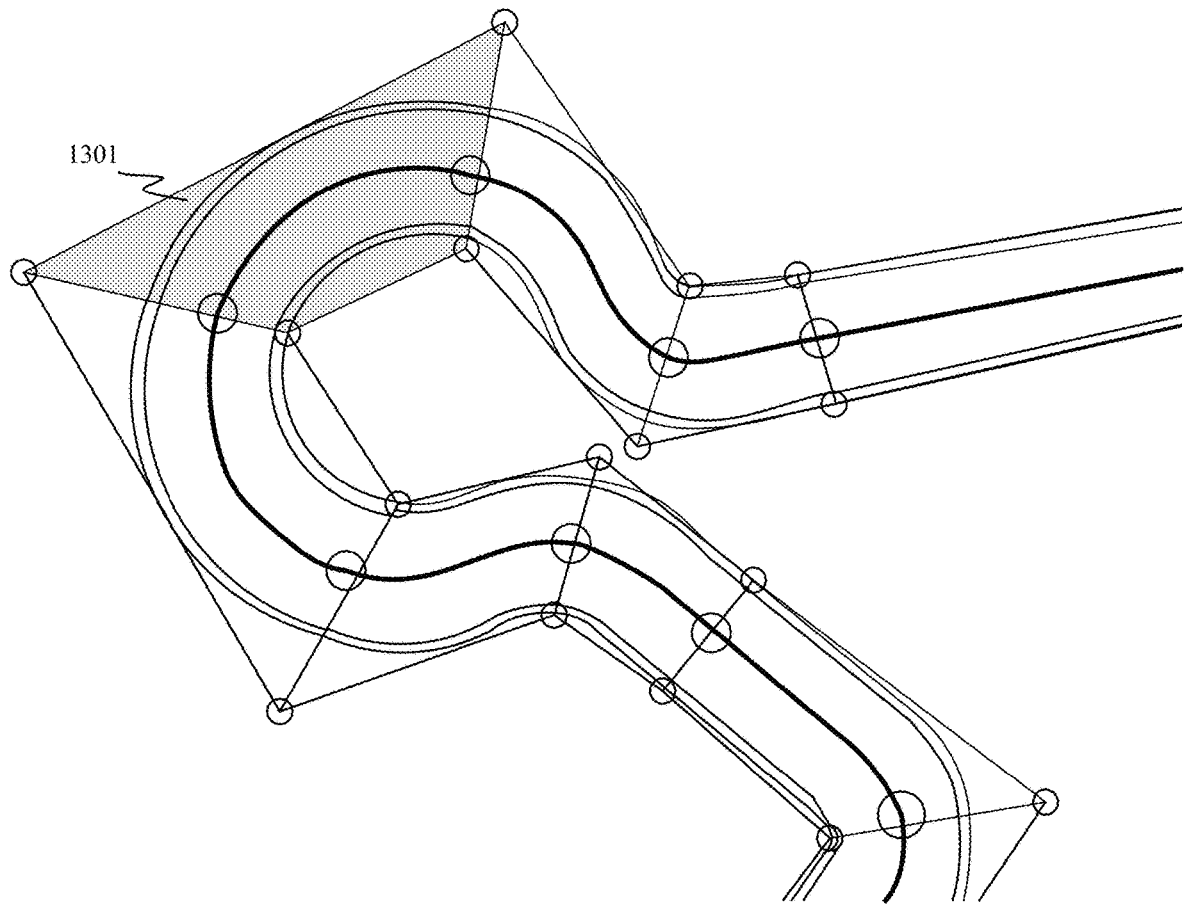
FIG. 14 is a schematic structural diagram of detection point areas obtained through division along a track according to an example embodiment of the disclosure.

A map area includes a plurality of detection point areas, and the detection point areas are convex quadrilateral areas obtained through division along a track. FIG. 14 shows detection point areas obtained through division along a track. Each detection point area is allocated a unique area identifier. A gray part 1301 in FIG. 14 is one detection point area in the map area.

Figure 15:
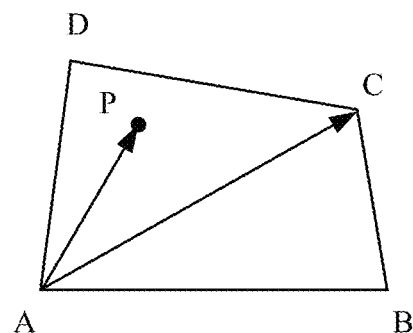
FIG. 15 is a schematic diagram of determining whether a camera model is in a detection point area according to an example embodiment of the disclosure.

Referring to FIG. 15, for example, a detection point area includes a point A, a point B, a point C, and a point D, and a point P is used as a position of a camera model. An algorithm for determining whether the camera model is in the detection point area is as follows:

(1) Determine whether the point P is on a left side or a right side of a vector $\overrightarrow{AC}$.

When the point P is on the left side of the vector $\overrightarrow{AC}$, it is determined whether the point P is in a triangle ACD; when the point P is on the right side of the vector $\overrightarrow{AC}$, it is determined whether the point P is in a triangle ABC.

(2) To determine whether the point P is in the triangle ACD, the following three conditions need to be met:

a. the point P is on the left side of the vector $\overrightarrow{AC}$;

b. the point P is on a left side of a vector $\overrightarrow{CD}$; and c. the point P is on a left side of a vector $\overrightarrow{DA}$.

(3) To determine whether the point P is in the triangle ABC, the following three conditions need to be met:

a. the point P is on a left side of a vector $\overrightarrow{AB}$;

b. the point P is on a left side of a vector $\overrightarrow{BC}$; and c. the point P is on a left side of a vector $\overrightarrow{CA}$.

To determine whether a point is on a left side or a right side of a vector, for example, whether the point P is on the left side or the right side of the vector $\overrightarrow{AC}$, an algorithm is as follows:

(1) Calculate a vector $\overrightarrow{AP}$.

(2) Obtain a cross product of the vector $\overrightarrow{AP}$ and the vector $\overrightarrow{AC}$, to obtain a normal vector $\vec{N}$ perpendicular to a plane APC.

(3) According to the principle of the left-hand coordinate system:

a. when the normal vector $\vec{N}$ is perpendicular to the plane APC and points upwards (a Y component of the vector $\vec{N}$ is greater than 0), $\overrightarrow{AP}$ is on the left side of $\overrightarrow{AC}$, that is, the point P is on the left side of $\overrightarrow{AC}$; and b. when the normal vector $\vec{N}$ is perpendicular to the plane APC and points downwards (a Y component of the vector $\vec{N}$ is less than 0), $\overrightarrow{AP}$ is on the right side of $\overrightarrow{AC}$, that is, the point P is on the right side of $\overrightarrow{AC}$.

A formula for calculating the cross product of the vector $\overrightarrow{AP}$ and the vector $\overrightarrow{AC}$ is as follows:

$$\overrightarrow{AP} \times \overrightarrow{AC} = (\overrightarrow{AP_x}, \overrightarrow{AP_y}, \overrightarrow{AP_z}) \times (\overrightarrow{AC_x}, \overrightarrow{AC_y}, \overrightarrow{AC_z}) = (\overrightarrow{AP_y AC_z} - \overrightarrow{AP_z AC_y}, \overrightarrow{AP_z AC_x} - \overrightarrow{AP_x AC_z}, \overrightarrow{AP_x AC_y} - \overrightarrow{AP_y AC_x})$$

When $\overrightarrow{AP_z AC_x} - \overrightarrow{AP_x AC_z} > 0$, it is determined that $\overrightarrow{AP}$ is on the left side of $\overrightarrow{AC}$, that is, the point P is on the left side of $\overrightarrow{AC}$.

When $\overrightarrow{AP_z AC_x} - \overrightarrow{AP_x AC_z} > 0$, is determined that $\overrightarrow{AP}$ is on the right side of $\overrightarrow{AC}$, that is, the point P is on the right side of $\overrightarrow{AC}$.

According to the foregoing algorithms, a processor of the computer device detects whether the detection point area in which the camera model is located in the current frame is the same as the detection point area in which the camera model is located in the previous frame. When the processor detects that the detection point area in which the camera model is located in the current frame is the same as the detection point area in which the camera model is located in the previous frame, the processor has read a PVS in the detection point area in which the camera model is located in the current frame, and rendered a visible object in the PVS in the detection point area in which the camera model is located in the current frame. When the processor detects that the detection point area in which the camera model is located in the current frame is different from the detection point area in which the camera model is located in the previous frame, operation S1202 is performed.

The PVS in the detection point area in which the camera model is located in the current frame is obtained according to any one of the methods shown in FIG. 2, FIG. 3, and FIG. 8. The processor stores the obtained PVS in the detection point area, and directly reads the stored PVS in the detection point area when performing 3D scene rendering.

Operation S1202: Read, in a case that the detection point area in which the camera model is located in the current frame is different from the detection point area in which the camera model is located in the previous frame, a track PVS of the detection point area in which the camera model is located in the current frame.

When the processor of the computer device detects that the detection point area in which the camera model is located in the current frame is different from the detection point area in which the camera model is located in the previous frame, the processor re-reads the track PVS of the detection point area in which the camera model is located in the current frame, and renders a visible object in the track PVS in the detection point area in which the camera model is located in the current frame.

Operation S1203: Perform rendering according to the track PVS of the detection point area in which the camera model is located in the current frame, to obtain a lens picture of the camera model.

The processor of the computer device reads the track PVS of the detection point area in which the camera model is located in the current frame, and renders the visible object in the track PVS in the detection point area in which the camera model is located in the current frame, to obtain the lens picture of the camera model.

Figure 16:
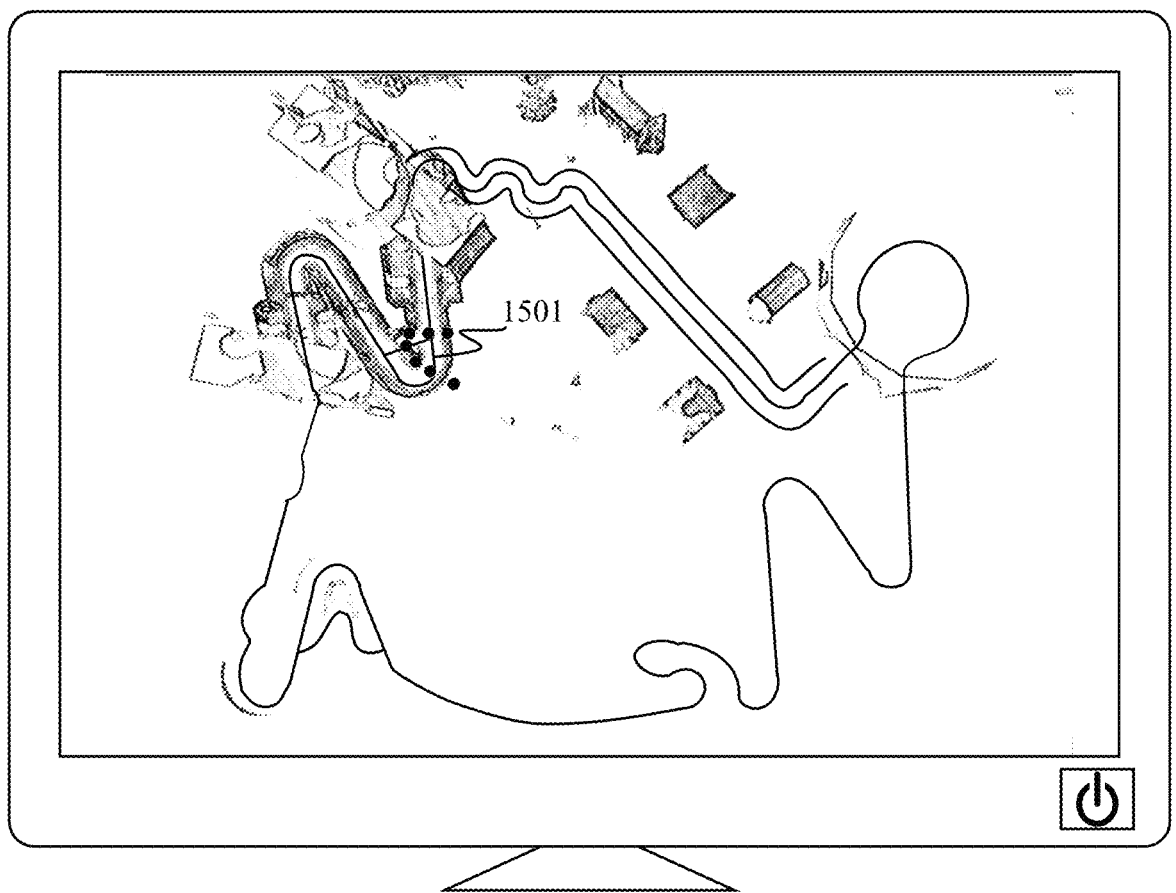
FIG. 16 is a schematic diagram of a camera model in an indoor scene according to an example embodiment of the disclosure.

For example, the processor of the computer device detects that an area in which the camera model is located in the current frame is an area shown in FIG. 16. An area 1501 surrounded by black dots in FIG. 16 is the detection point area in which the camera model is located in the current frame, and the area 1501 surrounded by the black dots is an indoor scene. The processor of the computer device reads a track PVS of the area 1501 surrounded by the black dots, and renders a visible object in the track PVS of the area 1501 surrounded by the black dots, to obtain a lens picture of a camera model shown in FIG. 17.

Figure 17:
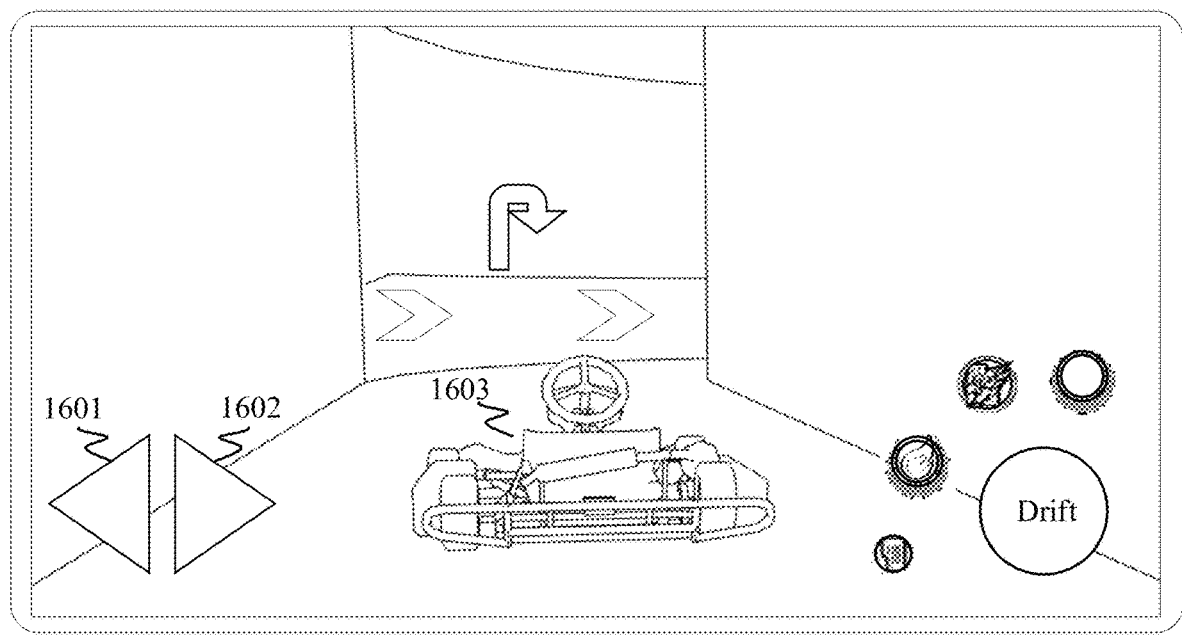
FIG. 17 is a schematic diagram of a lens picture of a camera model in an indoor scene according to an example embodiment of the disclosure.

The lens picture of the camera model shown in FIG. 17 is a lens picture of a user playing a 3D racing game. A left button 1601, a right button 1602, and a virtual object 1603 are displayed in the lens picture. The left button 1601 is configured to control the virtual object 1603 to drive to the left during racing, and the right button 1602 is configured to control the virtual object 1603 to drive to the right during racing. The virtual object 1603 drives in the indoor scene. When the user is playing the 3D racing game, the lens picture seen by the user is the same, but a visible object in another detection point area outside the indoor scene is not rendered, thereby reducing consumption of the processor.

Figure 18:
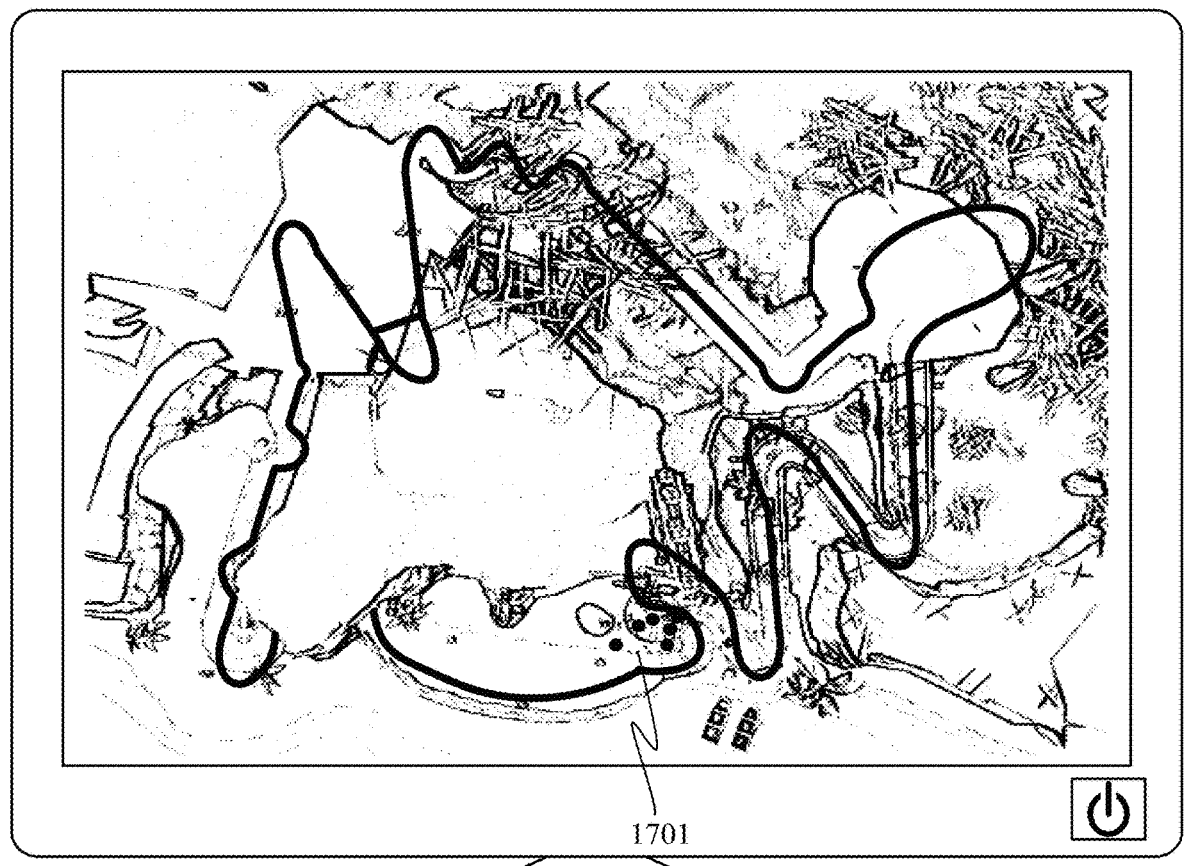
FIG. 18 is a schematic diagram of a camera model in an outdoor scene of the foot of a mountain according to an example embodiment of the disclosure.

Similarly, in a case shown in FIG. 18, the processor of the computer device detects that an area in which the camera model is located in the current frame is an area shown in FIG. 18. An area 1701 surrounded by black dots in FIG. 18 is the detection point area in which the camera model is located in the current frame, and the area 1701 surrounded by the black dots is an outdoor scene of the foot of a mountain. The processor of the computer device reads a track PVS of the area 1701 surrounded by the black dots, and renders a visible object in the track PVS of the area 1701 surrounded by the black dots. In addition, a visible object in an area other than the area 1701 surrounded by the black dots is culled, thereby reducing consumption of the processor.

Optionally, after determining the detection point area in which the camera model is located in the current frame, the processor of the computer device determines that a virtual object is in a state of racing on a road surface of a track, and determines that the camera model is located at a lower area detection point. The processor reads a first track PVS corresponding to the lower area detection point. The processor of the computer device performs rendering according to the first track PVS of the detection point area in which the camera model is located in the current frame, to obtain a first lens picture of the camera model. The first track PVS is a set of visible objects distributed along a track route at the lower area detection point in the detection point area. The first lens picture is a lens picture displayed after the camera model renders the visible object at the lower area detection point of the detection point area, that is, the first lens picture is a lens picture displayed in a state in which the virtual object is racing on the road surface of the track.

Optionally, after determining the detection point area in which the camera model is located in the current frame, the processor of the computer device determines that the virtual object is in a state of racing above the road surface of the track, and determines that the camera model is located at an upper area detection point. The processor reads a second track PVS corresponding to the upper area detection point. The processor of the computer device performs rendering according to the second track PVS of the detection point area in which the camera model is located in the current frame, to obtain a second lens picture of the camera model. The second track PVS is a set of visible objects distributed along the track route at the upper area detection point in the detection point area. The second lens picture is a lens picture displayed after the camera model renders the visible object at the upper area detection point of the detection point area, that is, the second lens picture is a lens picture displayed in a state in which the virtual object is racing above the road surface of the track.

In an embodiment, after determining the detection point area in which the camera model is located in the current frame, the processor of the computer device first renders a vertex of each visible object in the detection point area by using a vertex shader, to obtain a contour of the each visible object, and then renders a pixel of the each visible object by using a pixel shader, to obtain a 3D effect of the each visible object displayed in the lens picture.

In the method provided in this embodiment, it is detected that whether a detection point area in which a camera model is located in a current frame is the same as a detection point area in which the camera model is located in a previous frame, to determine a detection point area that currently needs to be rendered by a GPU. No extra rendering is required, thereby reducing consumption of a processor.

The following describes apparatus embodiments of the disclosure, which may be used for executing the method embodiments of the disclosure. For details not disclosed in the apparatus embodiments of the disclosure, refer to the method embodiments of the disclosure.

Figure 19:
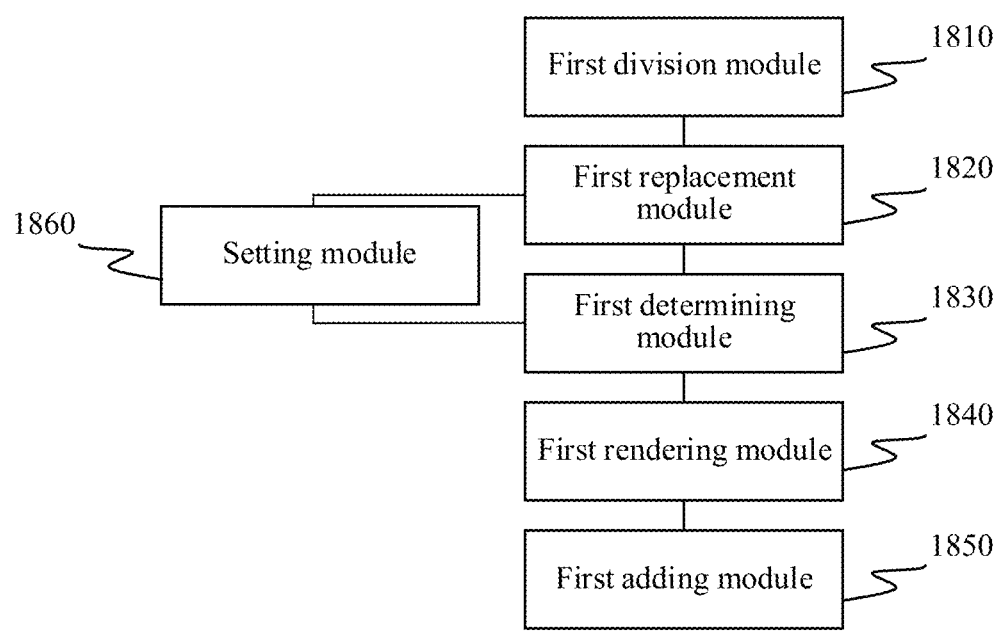
FIG. 19 is a schematic structural diagram of a PVS determining apparatus according to an example embodiment of the disclosure.

FIG. 19 is a schematic structural diagram of a PVS determining apparatus according to an example embodiment of the disclosure. The apparatus includes a first division module 1810, a first replacement module 1820, a first determining module 1830, a first rendering module 1840, and a first adding module 1850.

The first division module 1810 is configured to divide a map area into a plurality of detection point areas.

The first replacement module 1820 is configured to replace a map material of a 3D object in the detection point area with a single-colored material, color identifiers of single-colored materials corresponding to all 3D objects included in the virtual environment being different.

Figure 20:
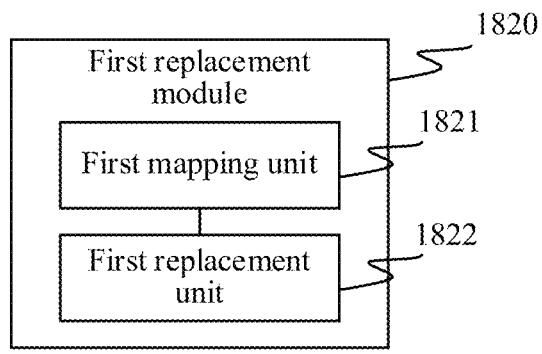
FIG. 20 is a schematic structural diagram of a first replacement module according to an example embodiment of the disclosure.

In an embodiment, as shown in FIG. 20, the first replacement module 1820 includes a first mapping unit 1821 and a first replacement unit 1822.

The first mapping unit 1821 is configured to map a unique object identifier of the 3D object in the detection point area to a color identifier.

In an embodiment, the first mapping unit 1821 is configured to map the last three bits of the unique object identifier of the 3D object in the detection point area to a red channel value, a green channel value, and a blue channel value in a red, green, and blue color space; and determine the color identifier corresponding to the 3D object according to the red channel value, the green channel value, and the blue channel value.

The first replacement unit 1822 is configured to replace the map material of the 3D object with a single-colored material corresponding to the color identifier.

The first determining module 1830 is configured to determine at least one detection point in the detection point area.

In an embodiment, the first determining module 1830 is configured to determine a plurality of discrete plane detection points in the detection point area; for each of the plurality of plane detection points, detect the plane detection point through physical model ray detection, to obtain a road surface height at the plane detection point; determine a lower area detection point corresponding to the plane detection point according to a first sum value obtained by adding the road surface height and a first height; and determine an upper area detection point corresponding to the plane detection point according to a second sum value obtained by adding the road surface height and a second height.

The first rendering module 1840 is configured to perform rendering to obtain a cubemap corresponding to the detection point, and determine a target color identifier of a single color appearing on the cubemap.

Figure 21:
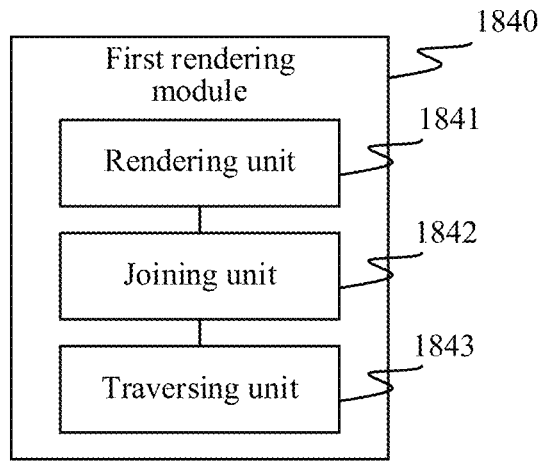
FIG. 21 is a schematic structural diagram of a first rendering module according to an example embodiment of the disclosure.

As shown in FIG. 21, the first rendering module 1840 includes:
a rendering unit 1841, configured to render each of six directional planes at the detection point to obtain a corresponding two-dimensional texture map on each directional plane;
a joining unit 1842, configured to join the two-dimensional texture maps on the six directional planes to obtain the cubemap corresponding to the detection point; and
a traversing unit 1843, configured to traverse pixel values of the two-dimensional texture maps on the six directional planes of the cubemap, and determine, according to the pixel values appearing on the two-dimensional texture maps, the target color identifier of a single color appearing on the cubemap.

The first adding module 1850 is configured to add a 3D object corresponding to the target color identifier to a PVS of the detection point area.

The first adding module 1850 is configured to add the 3D object corresponding to the target color identifier to a first PVS of the detection point area in a case that the target color identifier belongs to a cubemap corresponding to the lower area detection point; and add the 3D object corresponding to the target color identifier to a second PVS of the detection point area in a case that the target color identifier belongs to a cubemap corresponding to the upper area detection point.

The apparatus further includes:
a setting module 1860, configured to set an attribute of a translucent 3D object in the detection point area to a hidden attribute.

The setting module 1860 is configured to reset the attribute of the translucent 3D object in the detection point area to a display attribute, and set an attribute of a 3D object other than the translucent 3D object to the hidden attribute. The setting module 1860 may be configured to reset the attribute of the translucent 3D object to the display attribute after operation S304 to operation S310 shown in FIG. 3 are performed (that is, operations of obtaining the cubemap corresponding to the detection point and determining the target color identifier of the single color that appears on the cubemap with respect to a 3D object other than the translucent 3D object in the detection point area).

The first replacement module 1820 is configured to replace a map material of the translucent 3D object with a single-colored material, color identifiers of single-colored materials corresponding to all translucent 3D objects included in the virtual environment being different.

The first determining module 1830 is configured to determine at least one detection point in the detection point area.

The first rendering module 1840 is configured to perform rendering to obtain a cubemap corresponding to the detection point, and determine a target color identifier of a single color appearing on the cubemap.

The first adding module 1850 is configured to add a translucent 3D object corresponding to the target color identifier to the PVS of the detection point area.

Figure 22:
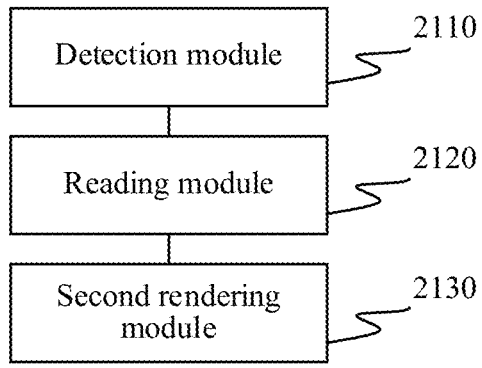
FIG. 22 is a schematic structural diagram of a 3D scene rendering apparatus according to an example embodiment of the disclosure.

FIG. 22 is a schematic structural diagram of a 3D scene rendering apparatus according to an example embodiment of the disclosure. The apparatus is applicable to a computer device storing a detection point area and a PVS. The PVS is obtained by using the method described above. The apparatus includes:

a detection module 2110, configured to detect whether a detection point area in which a camera model is located in a current frame is the same as a detection point area in which the camera model is located in a previous frame;

a reading module 2120, configured to read, in a case that the detection point area in which the camera model is located in the current frame is different from the detection point area in which the camera model is located in the previous frame, a PVS of the detection point area in which the camera model is located in the current frame; and a second rendering module 2130, configured to perform rendering according to the PVS of the detection point area in which the camera model is located in the current frame, to obtain a lens picture of the camera model.

The second rendering module 2130 is configured to perform rendering according to a first PVS of the detection point area in which the camera model is located in the current frame, to obtain a first lens picture of the camera model.

The second rendering module 2130 is configured to perform rendering according to a second PVS of the detection point area in which the camera model is located in the current frame, to obtain a second lens picture of the camera model.

Figure 23:
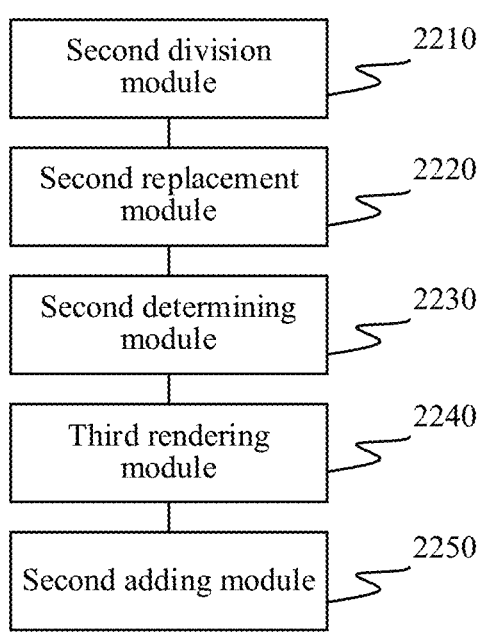
FIG. 23 is a schematic structural diagram of a PVS determining apparatus according to another example embodiment of the disclosure.

FIG. 23 is a schematic structural diagram of a PVS determining apparatus according to an example embodiment of the disclosure. The apparatus is applicable to a 3D racing game. The 3D racing game includes a track area located in a virtual environment. The apparatus includes:

a second division module 2210, configured to divide the track area into a plurality of detection point areas;

a second replacement module 2220, configured to replace a map material of a 3D object in the detection point area with a single-colored material, color identifiers of single-colored materials corresponding to all 3D objects included in the virtual environment being different;

a second determining module 2230, configured to determine at least one detection point in the detection point area;

a third rendering module 2240, configured to perform rendering to obtain a cubemap corresponding to the detection point, and determine a target color identifier of a single color appearing on the cubemap; and a second adding module 2250, configured to add a 3D object corresponding to the target color identifier to a track PVS of the detection point area.

The PVS determining apparatus and the 3D scene rendering apparatus provided in the foregoing embodiments are described only by using an example of division of functional modules. In actual application, functions may be allocated to different functional modules as required, which means that an internal structure of a device is divided into different functional modules to complete all or some of the functions described above. In addition, the PVS determining apparatus and the 3D scene rendering apparatus provided in the foregoing embodiments are designed with the same idea as the method embodiments of the PVS determining method and the 3D scene rendering method. For specific implementation processes thereof, refer to the method embodiments. Details are not described herein again.

Figure 24:
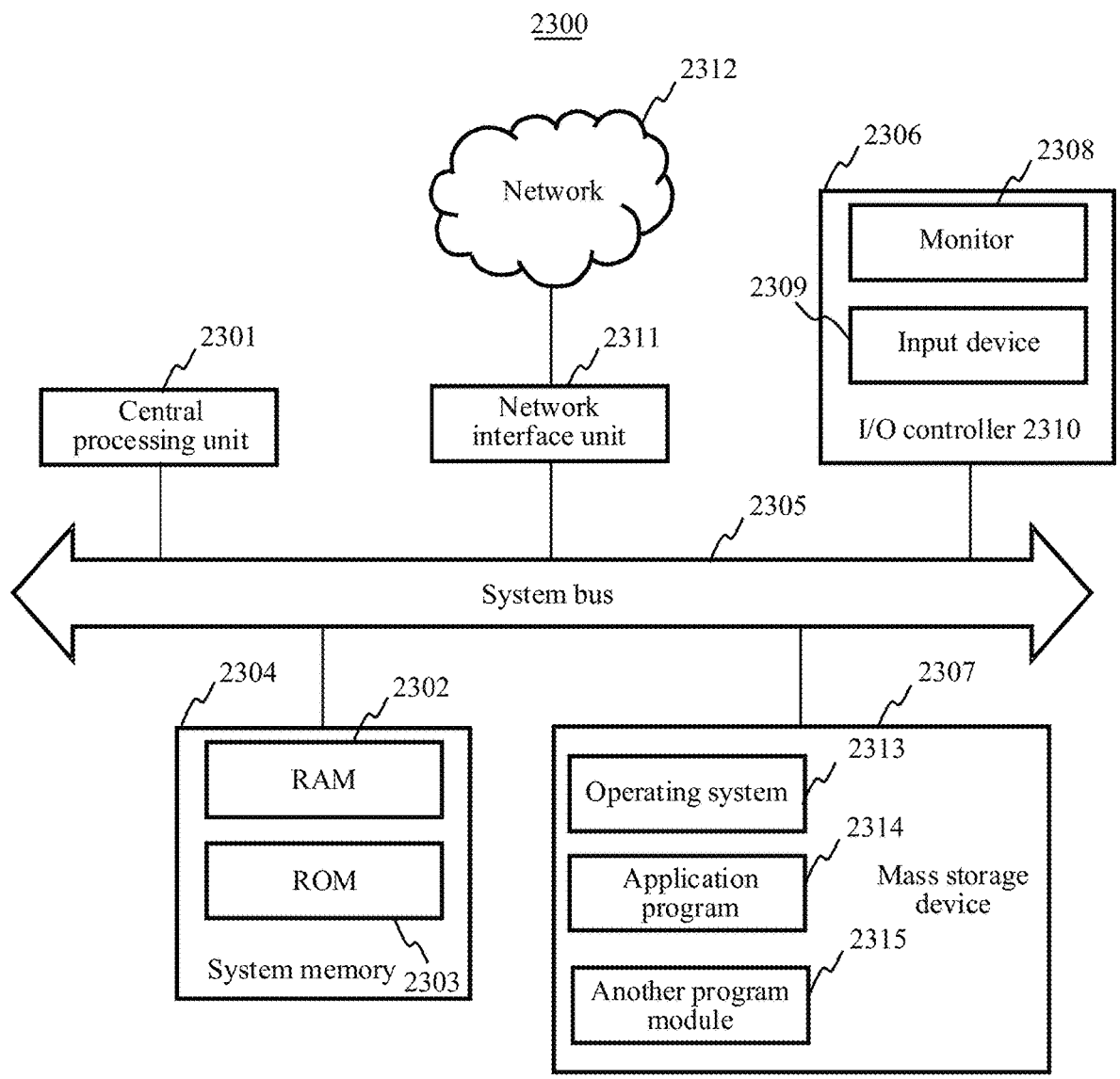
FIG. 24 is a schematic structural diagram of a server according to an embodiment of the disclosure.

FIG. 24 is a schematic structural diagram of a server according to an embodiment of the disclosure. The server may be the computer device mentioned in the foregoing embodiments, and is configured to implement the PVS determining method and/or the 3D scene rendering method provided in the foregoing embodiments.

The server 2300 includes a CPU 2301, a system memory 2304 including a random access memory (RAM) 2302 and a read-only memory (ROM) 2303, and a system bus 2305 connecting the system memory 2304 and the CPU 2301. The server 2300 further includes a basic I/O system 2306 for transmitting information between components in a computer, and a mass storage device 2307 used for storing an operating system 2313, an application program 2314, and another program module 2315.

The basic I/O system 2306 includes a monitor 2308 configured to display information and an input device 2309 such as a mouse or a keyboard that is configured for information inputting by a user. The monitor 2308 and the input device 2309 are both connected to the CPU 2301 by using an I/O controller 2310 connected to the system bus 2305. The basic I/O system 2306 may further include the I/O controller 2310, to receive and process inputs from a plurality of other devices, such as the keyboard, the mouse, or an electronic stylus. Similarly, the I/O controller 2310 further provides an output to a display screen, a printer, or another type of output device.

The mass storage device 2307 is connected to the CPU 2301 by using a mass storage controller (not shown) connected to the system bus 2305. The mass storage device 2307 and an associated computer readable medium provide non-volatile storage for the server 2300. That is, the mass storage device 2307 may include a computer readable medium (not shown), such as a hard disk or a CD-ROM drive.

The computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an EPROM, an EEPROM, a flash memory, or another solid-state storage technology, a CD-ROM, a DVD, or another optical storage, a magnetic cassette, a magnetic tape, a magnetic disk storage, or another magnetic storage device. Certainly, it may be known by a person skilled in the art that the computer storage medium is not limited to the foregoing several types. The system memory 2304 and the mass storage device 2307 may be collectively referred to as a memory.

According to various embodiments of the disclosure, the server 2300 may further be connected, by using a network such as the Internet, to a remote computer on the network and run. That is, the server 2300 may be connected to a network 2312 by using a network interface unit 2311 connected to the system bus 2305, or may be connected to another type of network or a remote computer system (not shown) by using the network interface unit 2311.

The memory further includes one or more programs. The one or more programs are stored in the memory and configured to be executed by one or more processors. The one or more programs include instructions for performing the following operations:

detecting whether a detection point area in which a camera model is located in a current frame is the same as a detection point area in which the camera model is located in a previous frame; reading, in a case that the detection point area in which the camera model is located in the current frame is different from the detection point area in which the camera model is located in the previous frame, a PVS of the detection point area in which the camera model is located in the current frame; and performing rendering according to the PVS of the detection point area in which the camera model is located in the current frame, to obtain a lens picture of the camera model.

Figure 25:
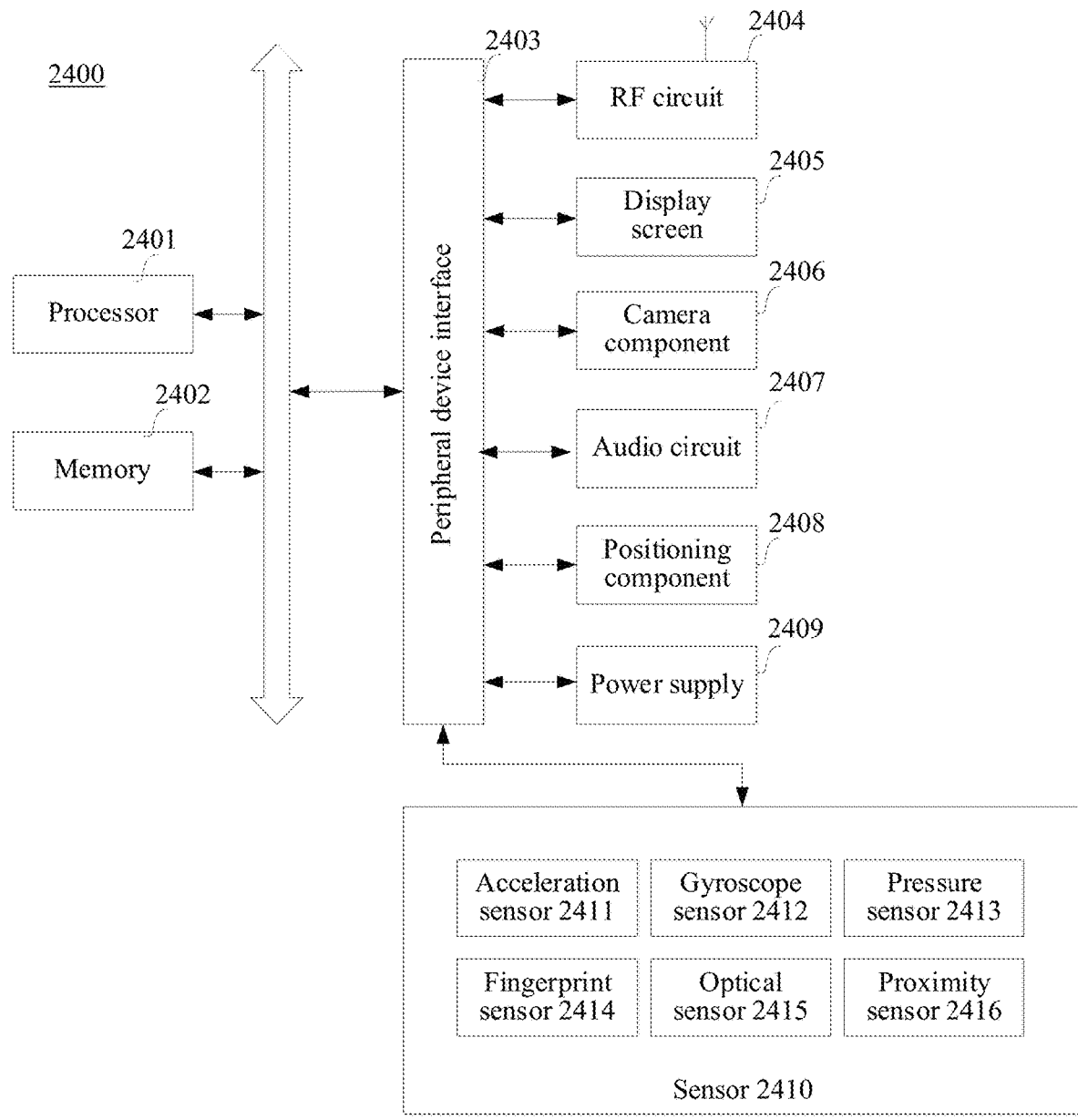
FIG. 25 is a structural block diagram of a terminal according to an example embodiment of the disclosure.

FIG. 25 shows a structural block diagram of a terminal 2400 according to an example embodiment of the disclosure. The terminal 2400 may be a smartphone, a tablet computer, an MP3 player, an MP4 player, a notebook computer, or a desktop computer. The terminal 2400 may also be referred to as another name such as user equipment, a portable terminal, a laptop terminal, or a desktop terminal.

Generally, the terminal 2400 includes a processor 2401 and a memory 2402.

The processor 2401 may include one or more processing cores, for example, may be a 4-core processor or an 8-core processor. The processor 2401 may be implemented by using at least one hardware form of a digital signal processor (DSP), a field-programmable gate array (FPGA), and a programmable logic array (PLA). The processor 2401 may also include a main processor and a coprocessor. The main processor is configured to process data in a wake-up state, which is also referred to as a CPU. The coprocessor is a low-power processor configured to process data in a standby state. In some embodiments, the processor 2401 may be integrated with a GPU. The GPU is configured to render and draw content that needs to be displayed on a display screen. In some embodiments, the processor 2401 may further include an artificial intelligence (AI) processor. The AI processor is configured to process computing operations related to machine learning.

The memory 2402 may include one or more computer-readable storage media that may be non-transitory. The memory 2402 may further include a high-speed RAM, and a non-volatile memory such as one or more magnetic disk storage devices or flash storage devices. In some embodiments, the non-transitory computer-readable storage medium in the memory 2402 is configured to store at least one instruction, and the at least one instruction is used for being executed by the processor 2401 to implement the PVS determining method and/or the 3D scene rendering method provided in the method embodiments of the disclosure.

In some embodiments, the terminal 2400 may further optionally include: a peripheral device interface 2403 and at least one peripheral device. The processor 2401, the memory 2402, and the peripheral device interface 2403 may be connected by using a bus or a signal cable. Each peripheral device may be connected to the peripheral device interface 2403 by using a bus, a signal cable, or a circuit board. In an example embodiment, the peripheral device includes: at least one of a radio frequency (RF) circuit 2404, a touch display screen 2405, a camera component 2406, an audio circuit 2407, a positioning component 2408, and a power supply 2409.

The peripheral device interface 2403 may be configured to connect at least one peripheral device related to I/O to the processor 2401 and the memory 2402. In some embodiments, the processor 2401, the memory 2402, and the peripheral interface 2403 are integrated on the same chip or circuit board. In some other embodiments, any one or two of the processor 2401, the memory 2402, and the peripheral interface 2403 may be implemented on a separate chip or circuit board. This is not limited in this embodiment.

The RF circuit 2404 is configured to receive and transmit an RF signal that is also referred to as an electromagnetic signal. The RF circuit 2404 communicates with a communication network and another communication device by using the electromagnetic signal. The RF circuit 2404 converts an electric signal into an electromagnetic signal for transmission, or converts a received electromagnetic signal into an electric signal. Optionally, the RF circuit 2404 includes: an antenna system, an RF transceiver, one or more amplifiers, a tuner, an oscillator, a digital signal processor, a codec chip set, a subscriber identity module card, and the like. The RF circuit 2404 may communicate with other terminals by using at least one wireless communication protocol. The wireless communication protocol includes, but is not limited to a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 2404 may also include a circuit related to near field communication (NFC). This is not limited in the disclosure.

The display screen 2405 is configured to display a UI. The UI may include a graph, text, an icon, a video, and any combination thereof. When the display screen 2405 is a touch display screen, the display screen 2405 also has the capability to collect a touch signal on or above a surface of the display screen 2405. The touch signal may be inputted to the processor 2401 as a control signal for processing. In this case, the display screen 2405 may be further configured to provide a virtual button and/or a virtual keyboard, also referred to as a soft button and/or a soft keyboard. In some embodiments, there may be one display screen 2405, disposed on a front panel of the terminal 2400. In some other embodiments, there may be at least two display screens 2405, respectively disposed on different surfaces of the terminal 2400 or designed in a foldable shape. In still some other embodiments, the display screen 2405 may be a flexible display screen, disposed on a curved surface or a folded surface of the terminal 2400. Even, the display screen 2405 may be further set to have a non-rectangular irregular graph, that is, a special-shaped screen. The display screen 2405 may be manufactured by using a material such as a liquid crystal display (LCD), an organic light-emitting diode (OLED), or the like.

The camera component 2406 is configured to collect an image or a video. Optionally, the camera component 2406 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, each being any one of a main camera, a depth of field camera, a wide-angle camera, and a telephoto camera, to implement a background blurring function through fusion of the main camera and the depth of field camera, panoramic photo shooting and virtual reality (VR) shooting functions through fusion of the main camera and the wide-angle camera, or another fusion shooting function. In some embodiments, the camera assembly 2406 may further include a flashlight. The flashlight may be a monochrome temperature flashlight or a double color temperature flashlight. The double color temperature flashlight is a combination of a warm flashlight and a cold flashlight, which may be used for light compensation at different color temperatures.

The audio circuit 2407 may include a microphone and a speaker. The microphone is configured to collect sound waves of a user and an environment, and convert the sound waves into electric signals and input the electric signals to the processor 2401 for processing, or input the electric signals into the RF circuit 2404 to implement voice communication. For the purpose of stereo collection or noise reduction, there may be a plurality of microphones, respectively disposed at different portions of the terminal 2400. The microphone may be further an array microphone or an omni-directional collection type microphone. The speaker is configured to convert electric signals from the processor 2401 or the RF circuit 2404 into sound waves. The speaker may be a conventional thin-film speaker or a piezoelectric ceramic speaker. When the speaker is the piezoelectric ceramic speaker, electric signals not only may be converted into sound waves that may be heard by human, but also may be converted into sound waves that cannot be heard by human for ranging and the like. In some embodiments, the audio circuit 2407 may further include an earphone jack.

The positioning component 2408 is configured to determine a current geographic location of the terminal 2400 for implementing navigation or a location based service (LBS). The positioning component 2408 may be a positioning component based on the global positioning system (GPS) of the United States, the BeiDou System of China, or the GALILEO System of Russia.

The power supply 2409 is configured to supply power to components in the terminal 2400. The power supply 2409 may be an alternating current, a direct current, a disposable battery, or a rechargeable battery. When the power supply 2409 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal 2400 may further include one or more sensors 2410. The one or more sensors 2410 include, but are not limited to: an acceleration sensor 2411, a gyroscope sensor 2412, a pressure sensor 2413, a fingerprint sensor 2414, an optical sensor 2415, and a proximity sensor 2416.

The acceleration sensor 2411 may detect a magnitude of acceleration on three coordinate axes of a coordinate system established by the terminal 2400. For example, the acceleration sensor 2411 may be configured to detect a component of gravity acceleration on the three coordinate axes. The processor 2401 may control, according to a gravity acceleration signal collected by the acceleration sensor 2411, the touch display screen 2405 to display the UI in a frame view or a portrait view. The acceleration sensor 2411 may be further configured to collect motion data of a game or a user.

The gyroscope sensor 2412 may detect a body direction and a rotation angle of the terminal 2400. The gyroscope sensor 2412 may cooperate with the acceleration sensor 2411 to collect a 3D action of the user on the terminal 2400. The processor 2401 may implement the following functions according to data collected by the gyroscope sensor 2412: motion sensing (for example, the UI is changed according to a tilt operation of the user), image stabilization during shooting, game control, and inertial navigation.

The pressure sensor 2413 may be disposed on a side frame of the terminal 2400 and/or a lower layer of the touch display screen 2405. When the pressure sensor 2413 is disposed on the side frame of the terminal 2400, a holding signal of the user on the terminal 2400 may be detected. The processor 2401 performs left and right hand recognition or a quick operation according to the holding signal collected by the pressure sensor 2413. When the pressure sensor 2413 is disposed on the lower layer of the touch display screen 2405, the processor 2401 controls, according to a pressure operation of the user on the touch display screen 2405, an operable control on the UI. The operable control includes at least one of a button control, a scroll bar control, an icon control, and a menu control.

The fingerprint sensor 2414 is configured to collect a fingerprint of a user, and the processor 2401 recognizes an identity of the user according to the fingerprint collected by the fingerprint sensor 2414, or the fingerprint sensor 2414 recognizes the identity of the user according to the collected fingerprint. When the identity of the user is recognized as credible, the processor 2401 authorizes the user to perform a related sensitive operation. The sensitive operation includes unlocking a screen, viewing encrypted information, downloading software, paying, changing a setting, and the like. The fingerprint sensor 2414 may be disposed on a front surface, a back surface, or a side surface of the terminal 2400. When a physical button or a vendor logo is disposed on the terminal 2400, the fingerprint 2414 may be integrated with the physical button or the vendor logo.

The optical sensor 2415 is configured to collect ambient light intensity. In an embodiment, the processor 2401 may control display brightness of the touch display screen 2405 according to the ambient light intensity collected by the optical sensor 2415. In an example embodiment, when the ambient light intensity is relatively high, the display brightness of the touch display screen 2405 is increased. When the ambient light intensity is relatively low, the display brightness of the touch display screen 2405 is reduced. In another embodiment, the processor 2401 may further dynamically adjust a camera parameter of the camera component 2406 according to the ambient light intensity collected by the optical sensor 2415.

The proximity sensor 2416, also referred to as a distance sensor, is generally disposed on the front panel of the terminal 2400. The proximity sensor 2416 is configured to collect a distance between the user and the front surface of the terminal 2400. In an embodiment, when the proximity sensor 2416 detects that the distance between the user and the front surface of the terminal 2400 gradually becomes smaller, the touch display screen 2405 is controlled by the processor 2401 to switch from a screen-on state to a screen-off state. When the proximity sensor 2416 detects that the distance between the user and the front surface of the terminal 2400 gradually becomes larger, the touch display screen 2405 is controlled by the processor 2401 to switch from the screen-off state to the screen-on state.

A person skilled in the art would understand that the structure shown in FIG. 24 constitutes no limitation on the terminal 2400, and the terminal may include more or fewer components than those shown in the figure, or some components may be combined, or a different component deployment may be used.

In an example embodiment, a computer-readable storage medium is further provided. The computer-readable storage medium is a non-volatile computer-readable storage medium. The computer-readable storage medium stores computer-readable instructions. The stored computer-readable instructions, when executed by a processing component, may implement the PVS determining method provided in the foregoing embodiments of the present disclosure.

In an example embodiment, a computer-readable storage medium is further provided. The computer-readable storage medium is a non-volatile computer-readable storage medium. The computer-readable storage medium stores computer-readable instructions. The stored computer-readable instructions, when executed by a processing component, may implement the 3D scene rendering method provided in the foregoing embodiments of the present disclosure.

In an example embodiment, a computer program product is further provided, the program product storing at least one instruction, at least one program, a code set, or an instruction set. The at least one instruction, the at least one program, the code set, or the instruction set is loaded and executed by a processor to implement the PVS determining method performed by the terminal shown in the foregoing method embodiments.

In an example embodiment, a computer program product is further provided, the program product storing at least one instruction, at least one program, a code set, or an instruction set. The at least one instruction, the at least one program, the code set, or the instruction set is loaded and executed by a processor to implement the 3D scene rendering method performed by the terminal shown in the foregoing method embodiments.

It is to be understood that "a plurality of" mentioned in the specification means two or more. The term "and/or" describes an association relationship for associated objects and represents that three relationships may exist. For example, A and/or B may represent the following three cases: only A exists, both A and B exist, and only B exists. The character "/" generally indicates an "or" relationship between the associated objects.

The sequence numbers of the foregoing embodiments of the disclosure are merely for description purpose, and do not indicate the preference among the embodiments.

A person of ordinary skill in the art would understand that all or some of the operations of the foregoing embodiments may be implemented by using hardware, or may be implemented by a program instructing relevant hardware. The program may be stored in a computer-readable storage medium. The storage medium mentioned above may be a ROM, a magnetic disk, an optical disc, or the like.

The foregoing descriptions are merely example embodiments of the disclosure, but are not intended to limit the disclosure. Any modification, equivalent replacement, or improvement made within the spirit and principle of the disclosure shall fall within the protection scope of the disclosure.

What is claimed is:

1. A method of determining a potentially visible set (PVS), performed by at least one processor of a computer device, the method comprising:
    dividing a map area into a plurality of detection point areas, the map area corresponding to a movable range of a virtual object in a virtual environment;
    replacing a map material of a three-dimensional (3D) object in a detection point area with a single-colored material, color identifiers of single-colored materials corresponding to all of 3D objects included in the virtual environment being different;
    determining at least one detection point in the detection point area;
    performing rendering to obtain a cubemap corresponding to the at least one detection point, and determining a target color identifier of a single color appearing on the cubemap; and
    adding a 3D object corresponding to the target color identifier to a PVS of the detection point area.

2. The method according to claim 1, wherein the performing the rendering comprises:
    rendering each of six directional planes, with respect to the at least one detection point, to obtain a corresponding two-dimensional texture map on each directional plane; and
    joining two-dimensional texture maps on the six directional planes to obtain the cubemap corresponding to the at least one detection point.

3. The method according to claim 2, wherein the determining the target color identifier comprises:
    traversing pixel values of the two-dimensional texture maps on the six directional planes of the cubemap, and determining, according to the pixel values appearing on the two-dimensional texture maps, the target color identifier of the single color appearing on the cubemap.

4. The method according to claim 1, wherein the replacing the map material comprises:
    mapping a unique object identifier of the 3D object in the detection point area to a color identifier; and
    replacing the map material of the 3D object with a single-colored material corresponding to the color identifier.

5. The method according to claim 4, wherein the mapping comprises:
    respectively mapping last three bits of the unique object identifier of the 3D object in the detection point area to a red channel value, a green channel value, and a blue channel value in a red, green, and blue color space; and
    determining the color identifier corresponding to the 3D object according to the red channel value, the green channel value, and the blue channel value.

6. The method according to claim 1, wherein the at least one detection point comprises a lower area detection point and an upper area detection point, and the determining the at least one detection point in the detection point area comprises:
    determining a plurality of plane detection points in the detection point area;
    with respect to each of the plurality of plane detection points, detecting a plane detection point through physical model ray detection, to obtain a road surface height at the plane detection point;

determining the lower area detection point corresponding to the plane detection point according to a first sum value obtained by adding the road surface height and a first height; and determining the upper area detection point corresponding to the plane detection point according to a second sum value obtained by adding the road surface height and a second height, the second height being a height above the road surface height at which the virtual object travels.

7. The method according to claim 6, wherein the adding the 3D object comprises:

adding the 3D object corresponding to the target color identifier to a first PVS of the detection point area based on the target color identifier that belongs to a cubemap corresponding to the lower area detection point; and adding the 3D object corresponding to the target color identifier to a second PVS of the detection point area based on the target color identifier that belongs to a cubemap corresponding to the upper area detection point.

8. The method according to claim 1, wherein the performing the rendering and the determining the target color identifier comprise:

setting an attribute of a translucent 3D object in the detection point area to a hidden attribute;

performing the rendering to obtain the cubemap corresponding to the at least one detection point and determining the target color identifier of the single color appearing on the cubemap with respect to a 3D object other than the translucent 3D object in the detection point area;

resetting the attribute of the translucent 3D object in the detection point area to a display attribute, and setting an attribute of the 3D object other than the translucent 3D object in the detection point area to the hidden attribute; and performing the rendering to obtain the cubemap corresponding to the at least one detection point, and determining the target color identifier of the single color appearing on the cubemap with respect to the translucent 3D object.

9. An apparatus for determining a potentially visible set (PVS), the apparatus comprising:

at least one memory configured to store program code; and at least one processor configured to read the program code and operate as instructed by the program code, the program code comprising:

division code configured to cause at least one of the at least one processor to divide a map area into a plurality of detection point areas, the map area corresponding to a movable range of a virtual object in a virtual environment;

replacement code configured to cause at least one of the at least one processor to replace a map material of a three-dimensional (3D) object in a detection point area with a single-colored material, color identifiers of single-colored materials corresponding to all of 3D objects included in the virtual environment being different;

determining code configured to cause at least one of the at least one processor to determine at least one detection point in the detection point area;

rendering code configured to cause at least one of the at least one processor to perform rendering to obtain a cubemap corresponding to the at least one detection point, and determine a target color identifier of a single color appearing on the cubemap; and adding code configured to cause at least one of the at least one processor to add a 3D object corresponding to the target color identifier to a PVS of the detection point area.

10. The apparatus according to claim 9, wherein the rendering code comprises:

rendering subcode configured to cause at least one of the at least one processor to render each of six directional planes at the at least one detection point to obtain a corresponding two-dimensional texture map on each directional plane; and joining subcode configured to cause at least one of the at least one processor to join two-dimensional texture maps on the six directional planes to obtain the cubemap corresponding to the at least one detection point.

11. The apparatus according to claim 10, wherein the rendering code is further configured to cause at least one of the at least one processor to traverse pixel values of the two-dimensional texture maps on the six directional planes of the cubemap, and determine, according to the pixel values appearing on the two-dimensional texture maps, the target color identifier of the single color appearing on the cubemap.

12. The apparatus according to claim 9, wherein the replacement code is further configured to cause at least one of the at least one processor to perform mapping a unique object identifier of the 3D object in the detection point area to a color identifier, and replace the map material of the 3D object with a single-colored material corresponding to the color identifier.

13. The apparatus according to claim 12, wherein the replacement code is further configured to cause at least one of the at least one processor to perform the mapping by:

respectively mapping last three bits of the unique object identifier of the 3D object in the detection point area to a red channel value, a green channel value, and a blue channel value in a red, green, and blue color space; and determining the color identifier corresponding to the 3D object according to the red channel value, the green channel value, and the blue channel value.

14. The apparatus according to claim 9, wherein the at least one detection point comprises a lower area detection point and an upper area detection point, and the determining code is further configured to cause at least one of the at least one processor to:

determine a plurality of plane detection points in the detection point area;

with respect to each of the plurality of plane detection points, detect a plane detection point through physical model ray detection, to obtain a road surface height at the plane detection point;

determine the lower area detection point corresponding to the plane detection point according to a first sum value obtained by adding the road surface height and a first height; and determine the upper area detection point corresponding to the plane detection point according to a second sum value obtained by adding the road surface height and a second height, the second height being a height above the road surface height at which the virtual object travels.

15. The apparatus according to claim 14, wherein the adding code is further configured to cause at least one of the at least one processor to:
  add the 3D object corresponding to the target color identifier to a first PVS of the detection point area based on the target color identifier that belongs to a cubemap corresponding to the lower area detection point; and
  add the 3D object corresponding to the target color identifier to a second PVS of the detection point area based on the target color identifier that belongs to a cubemap corresponding to the upper area detection point.

16. The apparatus according to claim 9, wherein the program code further comprises:
  setting code configured to cause at least one of the at least one processor to, after the map material is replaced, set an attribute of a translucent 3D object in the detection point area to a hidden attribute;
  first performing code configured to cause at least one of the at least one processor to perform the rendering to obtain the cubemap corresponding to the at least one detection point and determining the target color identifier of the single color appearing on the cubemap with respect to a 3D object other than the translucent 3D object in the detection point area;
  resetting code configured to cause at least one of the at least one processor to reset the attribute of the translucent 3D object in the detection point area to a display attribute, and set an attribute of the 3D object other than the translucent 3D object in the detection point area to the hidden attribute; and
  second performing code configured to cause at least one of the at least one processor to perform the rendering to obtain the cubemap corresponding to the at least one detection point, and determining the target color identifier of the single color appearing on the cubemap with respect to the translucent 3D object.

17. An apparatus for determining a potentially visible set (PVS), applicable to a three-dimensional (3D) racing game in a virtual environment, the apparatus comprising:
  at least one memory configured to store program code; and
  at least one processor configured to read the program code and operate as instructed by the program code, the program code comprising:
    second division code configured to cause at least one of the at least one processor to divide a track area in the virtual environment into a plurality of detection point areas;
    second replacement code configured to cause at least one of the at least one processor to replace a map material of a 3D object in a detection point area with a single-colored material, color identifiers of single-colored materials corresponding to all 3D objects included in the virtual environment being different;
    second determining code configured to cause at least one of the at least one processor to determine at least one detection point in the detection point area;
    second rendering code configured to cause at least one of the at least one processor to perform rendering to obtain a cubemap corresponding to the at least one detection point, and determine a target color identifier of a single color appearing on the cubemap; and
    second adding code configured to cause at least one of the at least one processor to add a 3D object corresponding to the target color identifier to a track PVS of the detection point area.

18. The apparatus according to claim 17, wherein the program code further comprises third rendering code configured to cause at least one of the at least one processor to read the track PVS of the detection point area in which a camera model is located in a current frame and perform rendering according to the track PVS of the detection point area, to obtain a lens picture of the camera model.

19. A computer device, comprising a processor and a memory, the memory storing computer-readable instructions, the computer-readable instructions, when executed by the processor, causing the processor to perform the method according to claim 1.

20. A non-transitory computer-readable storage medium, storing computer-readable instructions, the computer-readable instructions, when executed by one or more processors, causing the one or more processors to perform the method according to claim 1.

* * * * *